US009020885B2

(12) United States Patent
Beartusk et al.

(10) Patent No.: US 9,020,885 B2
(45) Date of Patent: Apr. 28, 2015

(54) SYSTEMS AND METHODS FOR COLLABORATION SHARED STATE MANAGEMENT

(75) Inventors: Brodi Beartusk, Lafayette, CO (US);
Timothy Breeden, Boulder, CO (US);
Daryl B. Olander, Boulder, CO (US);
Thomas A. Cook, Boulder, CO (US);
Manish Devgan, Broomfield, CO (US);
Richard Feit, Boulder, CO (US);
Christopher Jolley, Broomfield, CO (US); Edward K. O'Neil, Boulder, CO (US); Rodney McCauley, Loveland, CO (US); Gregory Smith, Westminster, CO (US); Shane Pearson, Boulder, CO (US); Kevin Blair Frender, Longmont, CO (US); Thomas Carl Stamm, Louisville, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/481,114

(22) Filed: May 25, 2012

(65) Prior Publication Data
US 2012/0239753 A1    Sep. 20, 2012

Related U.S. Application Data

(63) Continuation of application No. 11/055,048, filed on Feb. 10, 2005, now abandoned.

(60) Provisional application No. 60/574,010, filed on May 21, 2004.

(51) Int. Cl.
*G06F 17/30* (2006.01)
*G06Q 10/10* (2012.01)

(52) U.S. Cl.
CPC .......... *G06Q 10/10* (2013.01); *G06F 17/30598* (2013.01)

(58) Field of Classification Search
None
See application file for complete search history.

(56) References Cited

U.S. PATENT DOCUMENTS

| 5,923,848 | A | 7/1999 | Goodhand et al. |
| 6,029,195 | A | 2/2000 | Herz |
| 6,081,830 | A | 6/2000 | Schindler |
| 6,161,149 | A | 12/2000 | Achacoso et al. |

(Continued)

FOREIGN PATENT DOCUMENTS

WO    01/30057    4/2001

OTHER PUBLICATIONS

Danyu Zhu, Matt Mutka, "Sharing Presence Information and Message Notification in an Ad Hoc Network," PERCOM '03 Proceedings of the First IEEE International Conference on Pervasive Computing and Communications, Mar. 2003.

(Continued)

*Primary Examiner* — Bai D. Vu
(74) *Attorney, Agent, or Firm* — Meyer IP Law Group

(57) ABSTRACT

A system and method comprising, sharing information between a plurality of participants in a collaboration; and exposing a set of functions that enable a participant in the plurality of participants to share the information, the set of functions comprising: first functions to facilitate establishing a context in which to interact with the plurality of participants; and second functions to facilitate storing and retrieving values from a shared state, wherein the shared state is accessible within the context.

20 Claims, 14 Drawing Sheets

(56) References Cited

U.S. PATENT DOCUMENTS

| | | | |
|---|---|---|---|
| 6,230,287 B1 | 5/2001 | Pinard et al. | |
| 6,446,113 B1 | 9/2002 | Ozzie et al. | |
| 6,484,196 B1 | 11/2002 | Maurille | |
| 6,549,937 B1 | 4/2003 | Auerbach et al. | |
| 6,594,693 B1 | 7/2003 | Borwankar | |
| 6,640,241 B1 | 10/2003 | Ozzie et al. | |
| 6,681,247 B1 | 1/2004 | Payton | |
| 6,697,840 B1 | 2/2004 | Godefroid et al. | |
| 6,769,013 B2 | 7/2004 | Frees et al. | |
| 6,859,821 B1 | 2/2005 | Ozzie et al. | |
| 6,892,226 B1 | 5/2005 | Tso et al. | |
| 6,986,046 B1 | 1/2006 | Tuvell et al. | |
| 7,124,164 B1 | 10/2006 | Chemtob | |
| 7,130,885 B2 | 10/2006 | Chandra et al. | |
| 7,139,798 B2 | 11/2006 | Zircher et al. | |
| 7,162,528 B1 | 1/2007 | Simonoff et al. | |
| 7,171,472 B2 | 1/2007 | O'Brien et al. | |
| 7,203,674 B2 | 4/2007 | Cohen | |
| 7,234,117 B2 | 6/2007 | Zaner et al. | |
| 7,321,886 B2* | 1/2008 | Swaminathan et al. | 706/60 |
| 7,353,182 B1* | 4/2008 | Missinhoun et al. | 705/7.12 |
| 7,353,254 B2* | 4/2008 | Kusuda | 709/204 |
| 7,392,546 B2* | 6/2008 | Patrick | 726/26 |
| 7,568,217 B1* | 7/2009 | Prasad et al. | 726/3 |
| 7,664,750 B2 | 2/2010 | Frees et al. | |
| 7,676,542 B2* | 3/2010 | Moser et al. | 709/204 |
| 2001/0034791 A1 | 10/2001 | Clubb et al. | |
| 2001/0044827 A1* | 11/2001 | Zhuk | 709/205 |
| 2002/0055973 A1 | 5/2002 | Low et al. | |
| 2002/0075303 A1 | 6/2002 | Thompson et al. | |
| 2002/0075304 A1 | 6/2002 | Thompson et al. | |
| 2002/0087646 A1 | 7/2002 | Hickey et al. | |
| 2002/0138546 A1* | 9/2002 | Parsonnet et al. | 709/200 |
| 2002/0174191 A1 | 11/2002 | Robertson et al. | |
| 2002/0174201 A1 | 11/2002 | Ramer et al. | |
| 2003/0058884 A1 | 3/2003 | Kallner et al. | |
| 2003/0097410 A1 | 5/2003 | Atkins et al. | |
| 2003/0120508 A1 | 6/2003 | Kizor et al. | |
| 2003/0131061 A1 | 7/2003 | Newton et al. | |
| 2003/0163513 A1* | 8/2003 | Schaeck et al. | 709/201 |
| 2003/0163697 A1 | 8/2003 | Pabla et al. | |
| 2003/0167281 A1 | 9/2003 | Cohen et al. | |
| 2003/0177175 A1 | 9/2003 | Worley et al. | |
| 2003/0182371 A1 | 9/2003 | Worthen | |
| 2003/0187706 A1* | 10/2003 | Buchmiller et al. | 705/7 |
| 2003/0217105 A1 | 11/2003 | Zircher et al. | |
| 2003/0220972 A1 | 11/2003 | Montet et al. | |
| 2003/0220980 A1 | 11/2003 | Crane | |
| 2004/0015553 A1 | 1/2004 | Griffin et al. | |
| 2004/0088646 A1 | 5/2004 | Yeager et al. | |
| 2004/0104933 A1* | 6/2004 | Friedrich et al. | 345/751 |
| 2004/0107256 A1 | 6/2004 | Odenwald et al. | |
| 2004/0122693 A1* | 6/2004 | Hatscher et al. | 705/1 |
| 2004/0228531 A1 | 11/2004 | Fernandez et al. | |
| 2004/0249776 A1 | 12/2004 | Horvitz et al. | |
| 2004/0250201 A1 | 12/2004 | Caspi | |
| 2005/0018828 A1 | 1/2005 | Nierhaus et al. | |
| 2005/0027871 A1 | 2/2005 | Bradley et al. | |
| 2005/0034079 A1 | 2/2005 | Gunasekar et al. | |
| 2005/0108341 A1 | 5/2005 | Mathew et al. | |
| 2005/0125509 A1 | 6/2005 | Ramachandran | |
| 2005/0144230 A1 | 6/2005 | Russo et al. | |
| 2005/0210394 A1 | 9/2005 | Crandall et al. | |
| 2005/0216550 A1 | 9/2005 | Paseman et al. | |
| 2005/0216848 A1 | 9/2005 | Thompson et al. | |
| 2005/0262542 A1 | 11/2005 | DeWeese et al. | |
| 2006/0026502 A1 | 2/2006 | Dutta | |
| 2006/0059160 A1 | 3/2006 | Smola et al. | |
| 2006/0143214 A1 | 6/2006 | Teicher | |
| 2008/0086564 A1 | 4/2008 | Putman et al. | |
| 2008/0098030 A1 | 4/2008 | Edd et al. | |
| 2010/0287092 A1* | 11/2010 | Colman et al. | 705/38 |

OTHER PUBLICATIONS

International Search Report for PCT/US05/17758, dated Jul. 21, 2008.

* cited by examiner

SYSTEMS AND METHODS FOR COLLABORATION SHARED STATE MANAGEMENT

CLAIM OF PRIORITY

This application claims priority to U.S. Provisional Patent Application No. 60/574,010, entitled SYSTEMS AND METHODS FOR COLLABORATION SHARED STATE MANAGEMENT, by Brodi Beartusk et al., filed on May 21, 2004 and to U.S. patent application Ser. No. 11/055,048, entitled SYSTEMS AND METHODS FOR COLLABORATION SHARED STATE MANAGEMENT, by Brodi Beartusk et al., filed on Feb. 10, 2005, both of which applications are incorporated herein by reference.

CROSS-REFERENCE TO RELATED APPLICATIONS

This application is related to the following co-pending applications which are each hereby incorporated by reference in their entirety:

U.S. patent application Ser. No. 11/055,038 entitled SYSTEMS AND METHODS FOR ENTERPRISE COLLABORATION by Brodi Beartusk et al., filed on Feb. 10, 2005;

U.S. patent application Ser. No. 11/055,328 entitled SYSTEMS AND METHODS FOR A COLLABORATION SERVER, by Brodi Beartusk et al., filed on Feb. 10, 2005;

U.S. patent application Ser. No. 11/054,929 entitled SYSTEMS AND METHODS FOR A COLLABORATION CLIENT, by Brodi Beartusk et al., filed on Feb. 10, 2005;

U.S. patent application Ser. No. 11/054,982 entitled SYSTEMS AND METHODS FOR A COLLABORATION PRESENCE FRAMEWORK, by Brodi Beartusk et al., filed on Feb. 10, 2005;

U.S. patent application Ser. No. 11/055,430 entitled SYSTEMS AND METHODS FOR A COLLABORATION MESSAGING FRAMEWORK, by Brodi Beartusk et al., filed on Feb. 10, 2005;

U.S. patent application Ser. No. 11/055,320 entitled SYSTEMS AND METHODS FOR DYNAMIC CONFIGURATION OF A COLLABORATION, by Brodi Beartusk et al., filed on Feb. 10, 2005;

U.S. patent application Ser. No. 11/054,787 entitled SYSTEMS AND METHODS FOR COLLABORATION DYNAMIC PAGEFLOWS, by Brodi Beartusk et al., filed on Feb. 10, 2005;

U.S. patent application Ser. No. 11/055,436 entitled SYSTEMS AND METHODS FOR A COLLABORATIVE CALL CENTER, by Brodi Beartusk et al., filed on Feb. 10, 2005;

U.S. patent application Ser. No. 11/055,135 entitled SYSTEMS AND METHODS FOR A COLLABORATIVE GROUP CHAT, by Brodi Beartusk et al., filed on Feb. 10, 2005;

U.S. patent application Ser. No. 11/054,861, entitled SYSTEMS AND METHODS FOR AN EMBEDDED COLLABORATION CLIENT, by Brodi Beartusk et al., filed on Feb. 10, 2005;

U.S. patent application Ser. No. 11/055,327, entitled SYSTEMS AND METHODS FOR COLLABORATION IMPERSONATION, by Brodi Beartusk et al., filed on Feb. 10, 2005;

U.S. patent application Ser. No. 11/055,290 entitled SYSTEMS AND METHODS FOR COLLABORATION INTERCEPTORS, by Brodi Beartusk et al., filed on Feb. 10, 2005;

U.S. patent application Ser. No. 11/055,269, entitled SYSTEMS AND METHODS FOR COLLABORATIVE CO-NAVIGATION, by Brodi Beartusk et al., filed on Feb. 10, 2005;

U.S. patent application Ser. No. 11/055,047, entitled SYSTEMS AND METHODS FOR COLLABORATIVE CONTENT STORAGE, by Brodi Beartusk et al., filed on Feb. 10, 2005.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present disclosure relates generally to systems and methods to support dynamic user collaboration over computer networks.

BACKGROUND

A web page can provide easy, intuitive access to a company's goods and services. A web page's value lies in its ability to hide much of the complexity of backend business processes and business-to-business integration from an end user. However, web pages are not so good at allowing end users to collaborate with each other in the context of these business processes. Instant messaging is a simple example of a web-based collaboration application. However, instant messaging is limited in that it only allows users to interact with each other, rather than also enabling users to interact with business processes in a collaborative fashion.

DETAILED DESCRIPTION

Aspects of the invention are illustrated by way of example and not by way of limitation in the figures of the accompanying drawings in which like references indicate similar elements. It should be noted that references to "an", "one", "various" and "further" embodiments in this disclosure are not necessarily to the same embodiment, and such references mean at least one. If the following description, numerous specific details are set forth to provide a thorough description of the invention. However, it will be apparent to one skilled in the art that the invention may be practiced without these specific details. In other instances, well-known features have not been described in detail so as not to obscure the invention.

In various embodiments, systems and methods for providing collaboration among users in the context of business processes are presented. In aspects of these embodiments, a collaboration process can be developed in an integrated software development environment (IDE) or by using other suitable means. One example of an IDE is WebLogic® Workshop, available from BEA Systems, Inc. of San Jose, Calif. The collaboration process can be written in one or more programming languages, can be multi-threaded, subdivided into separated processes, and/or distributed among one or more computing devices/processors. The collaboration process can be deployed as a stand-alone program, in an application server, and/or as a resource (e.g., an object) accessible through one or more networks. Finally, the collaboration process can be implemented in software, hardware or as a combination of hardware component(s) and software.

Figure 1:
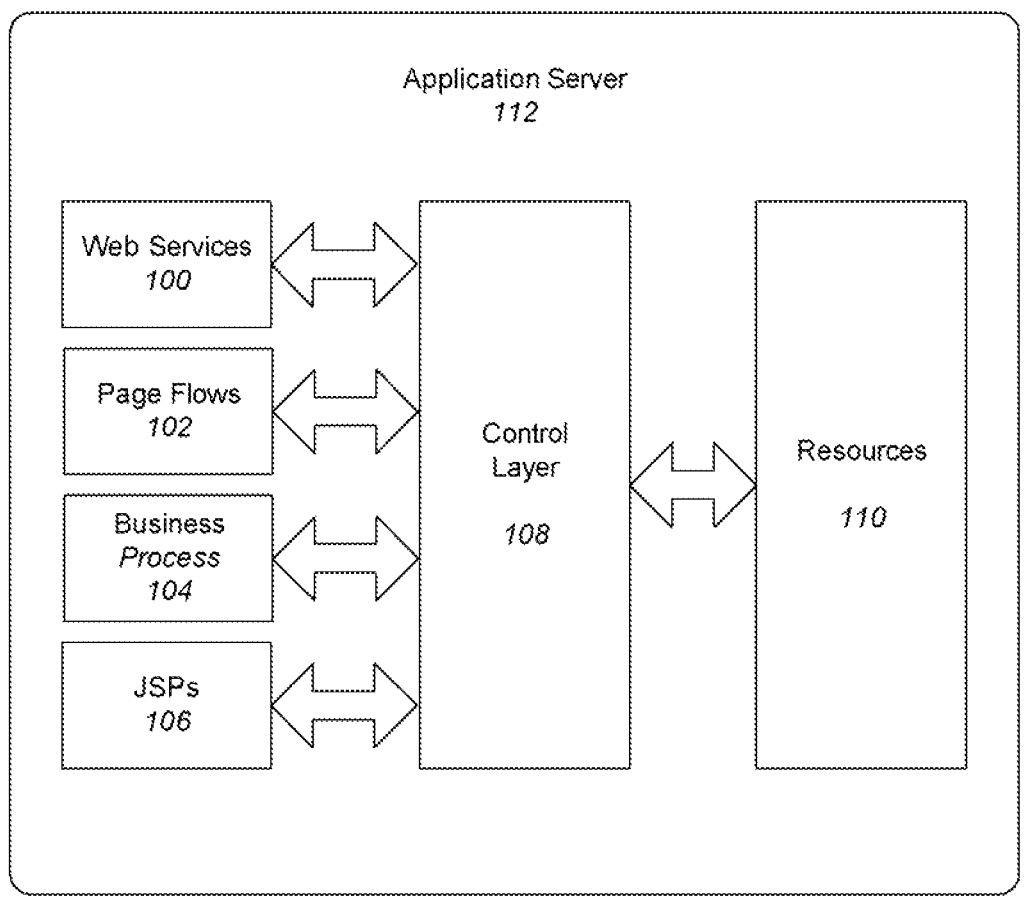
FIG. 1 is an exemplary illustration of the component parts of a collaboration process in various embodiments of the invention.

FIG. 1 is an exemplary illustration of the component parts of a collaboration process in various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

In various embodiments, the collaboration process can be implemented at least in part with one or more programming languages (e.g., Java®, C#, etc.). Of course, the scope of the present invention is not limited to any particular programming language or paradigm. In aspects of these embodiments, a collaboration process can include one or more Java® 2 Platform, Enterprise Edition (J2EE) components deployed on one or more application servers 112, such the WebLogic® Server, available from BEA Systems, Inc. By way of illustration, a collaboration process can include one or more of the following components:

Controls (illustrated singularly as control layer 108);
Web services 100;
Pageflows 102;
Business processes 104; and
JavaServer Pages (JSPs) 106, some or all of which may be part of one or more pageflows.

In addition to the Java® code that implements the logic of the component, each source code file can contain custom Javadoc annotations that can be used to determine runtime capabilities. The infrastructure referenced by these annotations can be implemented as J2EE components. In aspects of these embodiments, a collaboration process can ultimately be deployed as a pure J2EE application.

In various embodiments, a control encapsulates business logic and/or provides programmatic access to one or more resources 110. In aspects of these embodiments, a control model allows a collaboration process to access the business logic or resource in a consistent, straightforward manner as though it was a simple Java® object. Controls can simplify access to common resources such as databases, Java® Message Service (JMS) queues and Enterprise JavaBeans™ (EJBs). However, the present disclosure is not limited to or dependent on any particular control implementation, programming language or programming paradigm. It will be apparent to those of skill in the art that a control can be implemented in many other ways including, but not limited to, as a library, subroutine, function, method, macro, procedure, and any other suitable means for encapsulating program logic and/or resources.

In aspects of these embodiments and by way of illustration, a control can be implemented as a Java® class and can be managed at runtime by a J2EE EJB container. The container can provide automatic transactions, asynchrony, state management and other services. In aspects of these embodiments, a control's Java® class definition includes annotations (e.g., Javadoc annotations) that define the control's runtime behavior. A control can use and be used from a web service, a pageflow, a JSP, a business process, and another control. A commercial embodiment of controls is available from BEA Systems, Inc. See BEA WEBLOGIC® WORKSHOP™ HELP: ANNOTATIONS REFERENCE (Version 8.1 SP2, November 2003), which is incorporated herein in its entirety.

In various embodiments, a web service is a software component whose functionality can be accessed by sending Extensible Markup Language (XML) messages over common web protocols. Typically, these messages are in a specific XML dialect called SOAP (Simple Object Access Protocol). The messages usually represent requests for the web service to perform some operation. When a server hosting web services receives such a message, it delivers it to the entity that implements the web service business logic. When the operation completes, the web service typically responds to its client by sending an XML or SOAP response message.

Since web services can communicate via XML, a client and a web service are generally not aware of the programming language or operating system on which the other is implemented. For example, SOAP and XML Schema provide a language and operating system independent way to describe data types of arbitrary complexity. The first generation of web services was typically invoked over HTTP. However, the foundation of the web services concept is messaging and the protocol over which the messages are transported is irrelevant. In aspects of these embodiments, a web service can be specified as a Java® Web Service (JWS). A JWS can include a single Java® class that defines one or more methods that may be exposed as web service operations. An operation is invoked when a request for the Web service's Uniform Resource Locator (URL) is received and the request contains an appropriate XML or SOAP message identifying the operation to be performed and containing the data on which to operate. Javadoc annotations can be used to configure attributes of the web service and its operations.

In various embodiments, a pageflow can manage the presentation and flow of information among multiple Web pages, typically JSPs. A pageflow can control a user's interactive path through an application and can access back-end resources using controls. Pageflows are not dependent on any particular programming language, software framework or runtime paradigm. In aspects of these embodiments pageflows can leverage the Struts framework, an open source facility from the Apache Jakarta Project (http://jakarta.apache.org/struts/) for their runtime infrastructure. The pageflow model improves on the Struts model by centralizing the management of information flow across web pages. A pageflow can be defined as one or more Java® Pageflows (JPFs). A JPF can include a single Java® pageflow class that defines one or more action methods. The actions can be invoked according to rules defined in the JPF, and in response to user interactions with individual Web pages. Javadoc annotations can be used to configure attributes of the action methods. A commercial implementation of pageflows is available from BEA Systems, Inc. as part of their WebLogic® Portal product.

In various embodiments, a business process enables the integration of diverse applications and human participants, as well as the coordinated exchange of information between business partners and the enterprise. A business process is composed of a set of activities with a defined ordering. By way of illustration, a business process orchestrates the interaction of potentially diverse business systems (e.g., business-to-business order placement and tracking systems, etc.) and users wherein the business process itself is advanced by event generation and the exchange of messages. In aspects of these embodiments, a business process can be specified by a Java® Process Definition (JPD) which conforms to the JAVA® COMMUNITY PROCESS JAVA SPECIFICATION REQUEST (JSR) 207: PROCESS DEFINITION FOR JAVA® (available at www.jcp.org), which is included herein by reference in its entirety. In aspects of these embodiments, business processes can be compiled into EJBs and deployed on an application server. Entity beans can be used for stateful processes and session beans can be used for stateless processes.

Figure 2:
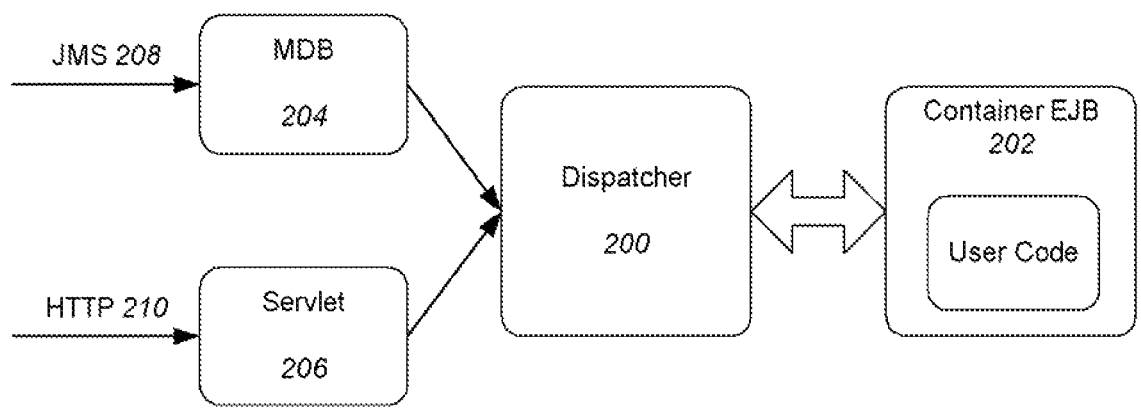
FIG. 2 is an exemplary high-level illustration of component invocation in various embodiments of the invention.

FIG. 2 is an exemplary high-level illustration of component invocation in various embodiments of the invention. In aspects of these embodiments, when a component is compiled, a collection of artifacts can be generated and/or configured for deployment (e.g., in an application server). These artifacts can include a dispatcher 200 and a component container 202. The component container can be a lightweight class that provides context and a consistent interface to other components. One or more transport objects (204, 206) in the web tier provide protocol support for invocation of components from external clients (e.g., web browsers or applications running in conjunction with web browsers). Transport objects receive invocation requests in a protocol-specific format (208, 210) and transform them into generic request objects that are passed to the dispatcher. Different transports can be supported, such as JMS and HTTP, however the present disclosure is not limited to or dependent on any particular transport. Accordingly, new transports not yet developed are fully within the scope and spirit of the present disclosure.

In various embodiments, web service invocations that arrive via HTTP can be received by a servlet 206. The collaboration process of which the web services are a part can be configured to route all requests for URLs (e.g., ending in ".jws") to this servlet. JWS URL routing, as well as any desired basic authentication security on specific Web service URLs, can be specified in standard J2EE web application deployment descriptors. Web service invocations that arrive via the JMS protocol can be directed to a specific configured JMS queue (not shown). A Message Driven Bean (MDB) 204 can be deployed to listen to this queue.

In aspects of these embodiments, the dispatcher can be constructed and used by all components within a collaboration process. In aspects of these embodiments, the dispatcher receives incoming request objects and routes them appropriately. The dispatcher for a particular application can include one or two EJBs (not shown), depending on the runtime features the developer has selected via annotations associated with the collaboration process components:

A Message Driven Bean that handles asynchronous invocations of component methods. Invocation requests are queued and serviced later. This bean can be deployed if the collaboration process contains one or more components with buffered methods.

A Stateless Session Bean to receive incoming synchronous method invocation requests. It can route synchronous requests directly to the appropriate component container (202) and asynchronous requests to the Message Driven Bean. Synchronous methods can have an annotation indicating such.

In various embodiments, a container (e.g., container EJB 202) can be used to wrap code found in web services, controls and business process definitions. Containers can provide special functions such as context services, control initialization and event routing, and container-specific pre/post-processing during request invocation. The container exposes a business interface that mirrors the public interface of the component it contains. This enables per-method declarative security on components. The code defined in a component's source file is ultimately executed directly by the container when a component method is invoked.

In aspects of these embodiments, there are two types of container EJBs:

A Stateless Session Bean that handles stateless (non-conversational) component method invocations. Since no state is required, these invocations can be handled by any pooled instance of this Stateless Session Bean.

An Entity Bean that handles stateful (conversational) component method invocations. Stateful methods require access to the persisted state of a particular component instance. This EJB is present if a web application contains one or more components with conversational methods (e.g., methods are annotated as to indicate whether they start, continue or finish a "conversation"). When a method marked as starting a conversation is invoked, a new entity bean instance is created to represent a new conversation instance. The data of the entity bean is the persisted state of the component's instance. Subsequent invocations of continue or finish methods operate on the instance of the entity bean.

In various embodiments, information can be returned to the client. In the case of synchronous method invocations, the return value of a component method can be translated into an XML or SOAP response via XML mapping. The response can be returned through the dispatcher to an appropriate transport object. If the request arrived via HTTP, the response can be packaged as an HTTP response and returned by the servlet as the response to the originating HTTP request. In the case of requests that arrive via JMS, no direct response is necessary. In the case of asynchronous method invocations, a client can optionally receive callbacks from the component whose method is being invoked if the client supplies a callback location (e.g., via a URL) during the conversation. The component's container can utilize a callback proxy to send information to the callback destination.

In various embodiments, a pageflow component controls navigation and data flow across a set of related Web pages in a collaboration process. In aspects of these embodiments, a pageflow is a Struts Web application. However, pageflows improve upon Struts in many key areas, such as providing access to controls. For more information on pageflows, see BEA WebLogic® Workshop™ Help (Version 8.1 SP2 Nov. 2003), available from BEA Systems, Inc., and which is incorporated herein by reference in its entirety.

The Struts framework is based on the Model-View-Controller (MVC) pattern. Struts is designed to allow a developer to choose the appropriate technology for the model and view portions, but in reality J2EE components are used for each of the parts: the views are typically implemented as JSPs (JavaServer Pages); the controller is typically a Java® servlet; and the model typically comprises one or more EJBs (Enterprise JavaBeans).

Figure 3:
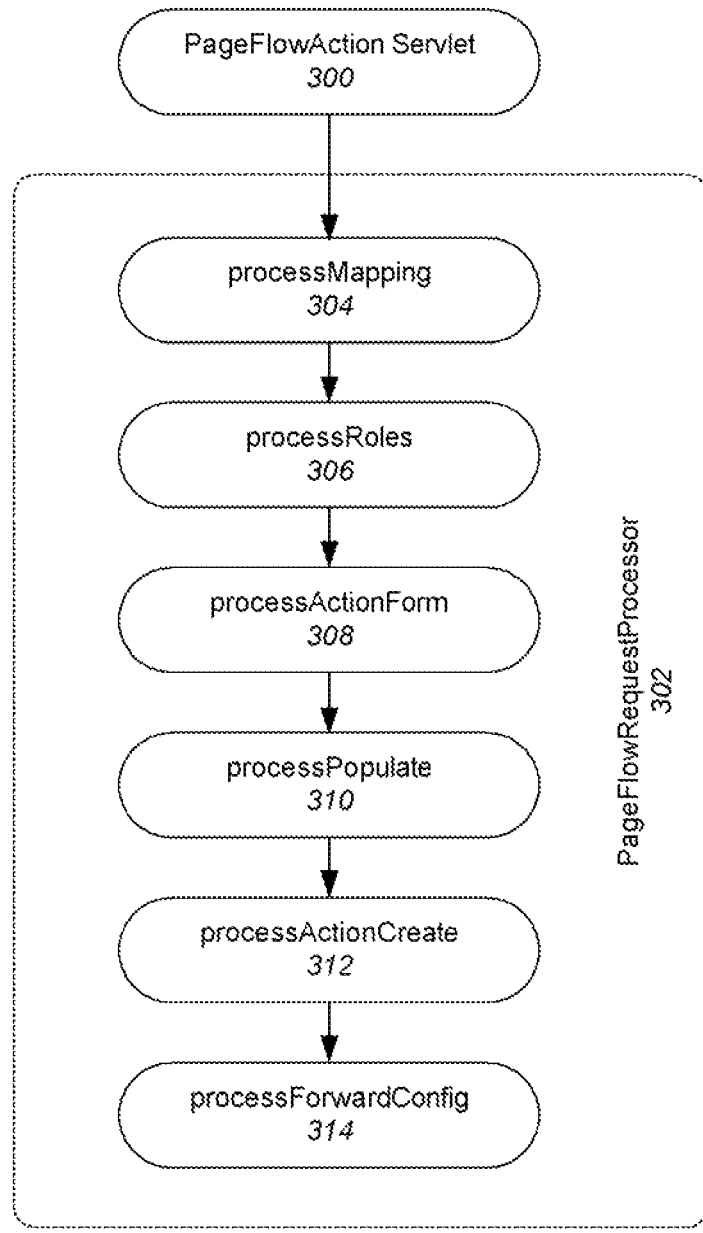
FIG. 3 is an exemplary illustration of the pageflow control flow and extensibility points in various embodiments of the invention.

The Struts framework provides multiple extensibility points where software developers can augment or replace the default Struts behavior. Pageflows exploit these extensibility points to provide a programming model that is simpler to use that pure Struts. FIG. 3 is an exemplary illustration of the pageflow control flow and extensibility points in various embodiments of the invention.

In various embodiments, a collaboration process is configured to intercept JSP requests with PageFlowJspFilter (a servlet filter mapped to "*.jsp"). On an incoming request for a JSP, if the directory path for the JSP corresponds to a registered Struts module (or a Struts module dynamically registered on-the-fly), that module is selected in the request. Struts provides an ActionServlet to which all action Universal Resource Identifiers (URIs) in a Struts application are directed. The servlet uses mappings that associate specific URI patterns with Struts modules to direct incoming requests to the appropriate module. The Struts framework allows substitution of a custom action servlet. In aspects of these embodiments, the ActionServiet has been substituted with a custom PageFlowActionServlet 300.

When a pageflow is compiled, Struts configuration files can be generated based on annotations in the pageflow source file. In various embodiments, a pageflow uses a configuration file to map incoming requests directed at specific URIs (or URI patterns) to servlets. For example, URIs that end in ".do" or ".jpf" can be mapped to the PageFlowActionServlet. Once an incoming request arrives, the PageFlowActionServlet looks for a registered Struts module to which the request's URI is mapped. If one is found, the request is dispatched to the request processor associated with that Struts module. The module that is found may be a pageflow Struts module that is registered dynamically.

Struts also provides a request processor object that is associated with each Struts module. The request processor shepherds a request through multiple phases including user role verification, action lookup, form data management, action dispatch, and request forwarding. The Struts framework allows substitution of a custom request processor. In aspects of these embodiments, the request processor has been substituted with a custom PageFlowRequestProcessor 302.

The Struts framework defines the request processor interface to allow it to be extended at various points in the processing of a request. The PageFlowRequestProcessor utilizes these extensibility points. A processMapping 304 extensibility point allows the PageFlowRequestProcessor to examine action mappings defined in a Struts configuration to find an action associated with the request's URI. If successful, processMapping returns an ActionMapping that encapsulates information about the action process.

The collaboration process may be configured to require that the user be authenticated as a member of a specific security role in order to execute specific actions. The processRoles 306 extensibility point determines whether the calling user is in a suitable role. An error can be returned to the browser if the user cannot be authenticated as belonging to the required role.

The request processor determines whether the target action has an associated form bean in a processActionForm 308 extensibility point and whether the form bean should be scoped to the request or to the session. The request processor then attempts to access the form bean in the request or session state. If it is not found, a new form bean can be created and stored in the appropriate state. The request processor then maps the request's input data to the form bean identified in the processActionForm in the processPopulate 310 extensibility point.

The request processor next finds the appropriate Action object. Struts instantiates an object using the class specified in the action mapping and returns the object in the processActionCreate 312 extensibility point. In various embodiments, the base class of each pageflow is derived from the Struts Action class. The PageFlowRequestProcessor instantiates the appropriate pageflow object (if necessary), caches it in the session and returns it as the Action. A pageflow object may also optionally implement lifecycle methods that will be invoked at appropriate times. These methods are on Create, beforeAction, afterAction and on Destroy. When the pageflow is instantiated, its on Create method is invoked.

In various embodiments, the PageFlowRequestProcessor invokes the pageflow's execute method. This method performs several steps around the invocation of the pageflow, including establishing a context that will be available to the pageflow. Request, response, session and action mapping objects are all stored in the pageflow object. The execute method invokes the pageflow's beforeAction lifecycle method. Next, the execute method invokes the pageflow action method, expecting an action Forward object to be returned. The controller then calls the pageflow's afterAction lifecycle method and returns an ActionForward object to the request processor. The ActionForward object represents a destination to which the PageFlowRequestProcessor can forward or redirect the client to in the processForwardConfig 314 extensibility point.

In various embodiments, interceptor objects can dynamically change pageflow topology by intercepting it. This is useful for a variety of situations, including replacing whole pageflows or inserting pageflow sequences into existing page flows. In aspects of these embodiments, interceptors can occur at the beginning or the end of a pageflow, or be evaluated in beforeAction and afterAction methods and create ActionForward objects whose destination pageflows can be dynamically determined. By way of illustration, this may be useful in a scenario where the first time a user navigates to a web page, they are presented with a notice of some kind. After reviewing the notice, the user can be automatically returned to the original web page. Before and after action pageflows have access to any posted form data both before and after interception. After interception, pageflows additionally can have access to the form that is populated by the action that was intercepted.

In various embodiments, interceptors can be rule-driven. Rules can be specified in any number of ways. The present invention is not dependent on or limited to any method for specifying interceptor rules. By way of illustration, a rule could specify the name of the pageflow that will be affected, whether the interceptor occurs in the beforeAction or afterAction method, and an identification of target action/pageflow. In aspects of these embodiments, changes to interceptor rules can be detected on-the-fly. Interceptor rules can also be modified by a "one time" flag, which means that the interception will occur only the first time through a target pageflow. In one embodiment, interceptions can be configured via an XML file that defines the source and target actions plus any modifiers to the interception like one-time. This configuration information is also run-time accessible, so that any of the configured interceptions can be turned on and off programmatically, or even have the source and target information updated programmatically.

Figure 4:
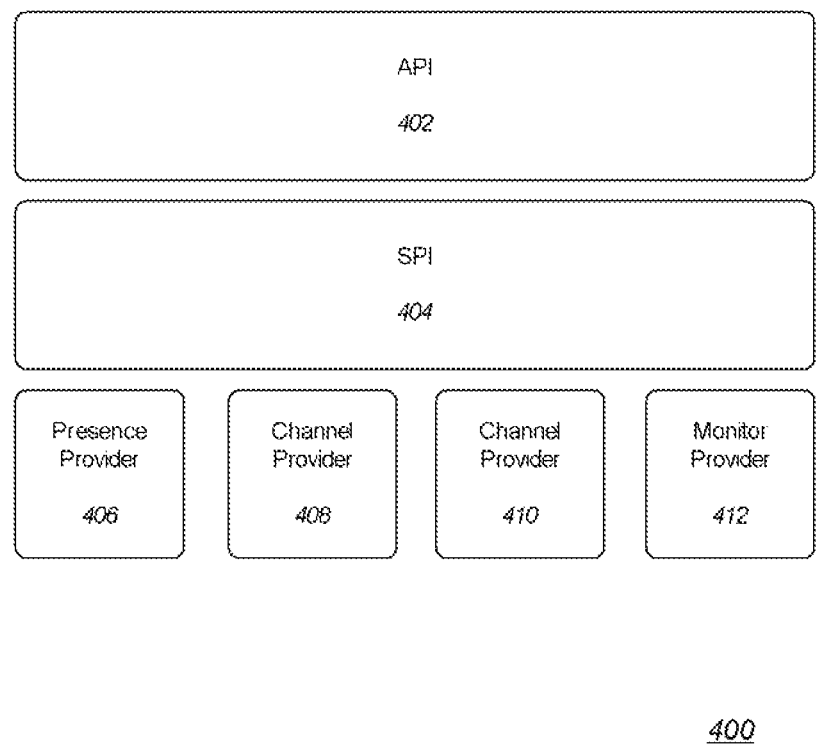
FIG. 4 is an exemplary illustration of a messaging layer in various embodiments of the invention.

FIG. 4 is an exemplary illustration of a messaging layer in various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

A collaboration scenario (hereinafter referred to as a "collaboration" or a "scenario") can include a number of client users and/or processes (hereinafter referred to as "clients") working together under the coordination of a collaboration process. In various embodiments, the scenario participants (i.e., the client(s) and the collaboration process) can interact using a protocol that is known among them. In aspects of these embodiments, the protocol can be transmitted via any communication medium including, but not limited to, one or more public and/or private networks, shared memory, a file system, distributed objects, and any other suitable means for exchanging information.

In various embodiments, a messaging layer 400 provides a communication medium for the scenario participants. Participants can interact with each other through the messaging layer by utilizing an Application Programming Interface (API) 402. The API exposes messaging functionality without creating dependence on any underlying communication facility. The API may also include one or more specialized APIs (not shown) tailored to performing certain tasks. In aspects of these embodiments, API functionality can be surfaced to participants as a software library, as one or more a object(s), and/or by any other suitable means.

The messaging layer also includes a Service Provider Interface (SPI) 404 that allows one or more communication providers (406-412) to dynamically "plug into" the messaging layer by implementing some or all of the SPI and thereby making their services available to the API. In aspects of these embodiments, SPI functionality can be surfaced as a library, as one or more object(s), and/or by any other suitable means. In aspects of these embodiments, providers can be dynamically created at run-time by an SPI factory class that constructs a provider implementation based on parameters such as required bandwidth, transport reliability, protocol, etc. In various embodiments, multiple communication providers can be supported concurrently by the messaging layer. This allows multiple transports within a scenario to be utilized (e.g., instant messaging and e-mail). In further aspects of these embodiments, when multiple providers co-exist, one can be designated as the "default" transport to use for communication when the provider is not specified. Those of skill in the art will appreciate that a communication provider is a is not limited to providing network-based communication, but can be based on any method for exchanging information such as (but not limited to): inter-process communication, inter-processor communication, communication through shared memory or other storage systems, and other suitable communication links within a given computing device.

The SPI allows the API to access the functionality of providers in a provider-independent fashion. Since each provider implements some or all of the SPI, providers can be changed without requiring changes to the API. This allows for accommodation of new communication facilities and technologies as they become available since the nature of underlying communication providers is hidden by the SPI. Accordingly, the present disclosure is not limited to any particular communication protocol or physical layer transport. Those of skill in the art will appreciate that many such providers are possible and fully within the scope and spirit of the present disclosure.

The SPI may include one or more specialized SPIs (not shown). In aspects of these embodiments, the SPI can include functionality for initializing, starting and stopping providers. The SPI can also provide access to specialized SPIs tailored to specific tasks. In aspects of these embodiments, the message provider SPI can expose functionality including:

Functionality for initializing a provider. This might include configuring the respective provider's server or other processes, if any (e.g., an instant messaging server.)

Functionality for obtaining provider attributes, such as capabilities. For example, the encryption schemes and reliability supported by a given provider.

Functionality for obtaining a user account manager API, wherein such an API exposes functionality related to managing user accounts. For example, changing user passwords and user permissions.

Functionality for obtaining a user presence manager API, wherein such an API exposes functionality to provide user presence related information.

Functionality for obtaining a connection manager API. By way of illustration, such an SPI can expose connection management functionality such as the ability to login into a server, the ability to obtain a valid communication connection based on a set of attributes (e.g., the type of encryption scheme to use, etc.), the ability to obtain a unique identifier for a connection, and the ability to send and receive messages.

Functionality for receiving events related to communication. In aspects of these embodiments, this method allows the registration of a methods, objects or functions ("message listeners") to receive a notification when a message is ready to be retrieved on a given provider connection. In aspects of these embodiments, multiple message listeners can be associated with a given connection.

Methods for processing messages (e.g., parsing, extracting information, etc.)

One type of SPI provider is a channel (e.g., 408 and 410). A channel is responsible for transporting messages and making them available to participants. Channels can provide asynchronous and/or synchronous communication. In the case of asynchronous communication, the channel can direct received messages to one or more registered message listeners. In various embodiments, a channel can be based on the Extensible Messaging and Presence Protocol (XMPP), available from the Jabber Software Foundation (www.jabber.org). XMPP is an instant messaging protocol based on Extensible Markup Language (XML). An XMPP-based channel provider can communicate with an external XMPP server to exchange messages with other participants and to propagate presence information. Presence information allows a participant to find other participants for a scenario. Other implementations based on similar or different communication technologies are possible and fully within the scope and spirit of the present disclosure. All that is required from the messaging layer's standpoint is conformance to the SPI.

The notion of presence is used in the Instant Messaging (IM) world. IM support of presence is centered on providing a status ("available", "unavailable", "away from my desk", etc.) for all the users in one's roster (also referred as "Buddy Lists"). In aspects of these embodiments, presence information can be tied to information about a user or other information through the use of roles. In addition to sending and receiving messages, the messaging layer API can also can provide presence and status information to participants if an SPI provider supports it (as in the case with providers based on XMPP). Presence information can be provided by a channel provider or by a special purpose presence provider (406) which scenario participants can use to let each other know of their presence and status (e.g., by broadcasting the information to the other participants or by updating a central repository). By way of illustration, the presence provider can utilize the channel provider to communicate presence information. In various embodiments, there are two types of presence information: user and application presence. User presence and status provides information pertaining to the availability of a participant for a scenario. In aspects of these embodiments, user presence can be based on roles. Application presence provides information pertaining to the availability of a particular application. The presence of an application may be important where there is a need to find appropriate participants who have the required application running In various embodiments, the API can provide role-based presence functionality. This allows users that map to a specific role and presence status to be dynamically invited into a running scenario. In aspects of these embodiments, presence functionality will be able to provide a set of users that map to a given role and are "available" to participate in a scenario. In aspects of these embodiments, a role is a dynamic set of users. A role can be based on attributes shared by its members and can be defined by one or more membership criteria. Role mapping is the process by which it is determined whether or not a user satisfies the membership criteria for a given role. For purposes of discussion, a role can be described as follows:

Role=PMembers+[Membership Criteria]

where PMembers is a set of user(s), group(s) and/or other role(s) that form a pool of potential members of this role subject to the Membership Criteria, if any. For a user or a process to be in a role, they must belong to PMembers and satisfy the Membership Criteria. The Membership Criteria can include one or more conditions. By way of illustration, such conditions can include, but are not limited to, one or more (possibly nested and intermixed) Boolean, mathematical, functional, relational, and/or logical expressions. Because roles can be evaluated dynamically at run-time, they can also be changed dynamically while scenario participants are active. This gives a tremendous amount of flexibility to system administrators since fundamental operating parameters of scenarios can be changed without recompiling or restarting the effected programs.

By way of illustration, consider the following Administrator role:

Administrator=Joe, Mary, SuperUser+CurrentTime>5:00 pm

The Administrator role has as its potential members two users (Joe and Mary) and users belonging to the user group named SuperUser. The membership criteria includes a condition that requires the current time to be after 5:00 pm. Thus, if a user is Joe, Marry or belongs to the SuperUser group, and the current time is after 5:00 pm, the user is a member of the Administrator role.

In various embodiments, Membership Criteria can be based at least partially on a user's properties. By way of illustration, consider the roles defined in Table 1 below.

TABLE 1

Exemplary Roles in Various Embodiments

| ROLE NAME | PMEMBERS | MEMBERSHIP CRITERIA |
|---|---|---|
| Supervisor | Joe, Mary, Paul, Timothy | Job_Title = "Manager" AND Department = "Customer Support" AND Status = "Available" |
| Service_Rep | All Users | Not(Administrator) AND Status = "Available" |

The Supervisor role includes as its potential members users Joe, Marry, Paul and Timothy. In order to qualify for the role, these users must satisfy the membership criteria which require a job title of "Manager", a department of "Customer Support" and a presence status of "Available". The Service_Rep role specifies that all users of the system are its potential members, but only those who do not qualify for the Supervisor role and are available. A commercial embodiment of a role-based system is the BEA WebLogic® Portal, available from BEA Systems, Inc.

In various embodiments, role-based presence information can be evaluated as needed since such a determination could introduce processing delays. In aspects of these embodiments, different mechanisms can be used to keep role-based presence information up-to-date. In the worst case embodiment, a role's membership criteria are recalculated each time a role is referenced. A more intelligent solution can look to the criteria itself to determine how frequently a role needs to be recalculated.

By way of illustration, some criteria change more frequently than others. Group membership, for example, will not change that often since it is typically established only once by a system administrator. Hence roles that only have group criterion do not need to be re-evaluated while a given user is logged in—just once at login time. On the other hand, date/time criteria change more frequently than group membership so roles whose membership criteria depend on date/time information can become stale very quickly (e.g., during the lifespan of a scenario). In aspects of these embodiments, presence information can be kept fresh by reevaluating roles that depend on date/time criteria at a set interval. Thus, given a set of role membership criteria, the criteria that is considered most volatile can drive the frequency at which the role is reevaluated.

In various embodiments, the messaging API can support the feature of subscription wherein client processes and collaboration processes can subscribe to presence information for given role(s). In aspects of these embodiments, a presence provider, channel provider or other process can monitor changes to role membership and notify client processes and/or collaboration processes that have registered to receive such notification of any such changes. The messaging API provides the ability for a given process to subscribe to one or more roles. In aspects of these embodiments, users in a given role can either decline or accept a subscription request in order to protect their privacy. In additional aspects of these embodiments, such approval can be automated through the use of rules and/or roles such that no user input is required. By way of illustration, a user may choose to automatically accept any subscription requests by processes/users in a given set of roles.

Referring again to FIG. 4, a monitor provider 412 can provide messaging layer monitoring to support administration and auditing activities. By way of a non-limiting example, a monitor provider can track the flow of messages for other providers. In aspects of these embodiments, a monitor provider can be configured using rules that determine what activities it will track. Rules can be expressed in a natural language, graphically, through expressions, or through any other suitable means. A rule can contain one or more expressions that can substitute expression variables from presence information, user profile information (e.g., name, address, position, etc.), or any other information. In various embodiments, a rule can include mathematical, logical and Boolean operators, function/method invocations, macros, SQL (Structured Query Language), and any other suitable query language. In various embodiments, an expression can be preprocessed one or more times to perform variable substitution, constant folding and/or macro expansion. It will be apparent to those of skill in the art that many other types of expressions are possible and fully within the scope and spirit of this disclosure.

In one embodiment, each time functionality in the SPI is accessed the monitor provider can be notified by the SPI (e.g., via an event) so that it may (optionally) log and/or act on the information. Alternatively, or in addition to, providers can proactively notify the monitor provider of events as they happen through a specialized monitor SPI. In this way, all events (e.g., sending and receiving messages, propagation of presence information) can be tracked whether or not the API is invoked by a participant. In aspects of these embodiments, the monitor provider can notify other processes (e.g., by sending messages) of events that trigger rules. For example, if process "A" wants to know when the number of messages sent by a given provider has exceeded a certain number, a rule can be specified with this condition specifying that process "A" will be notified when the number of message exceeds the limit.

Figure 5:
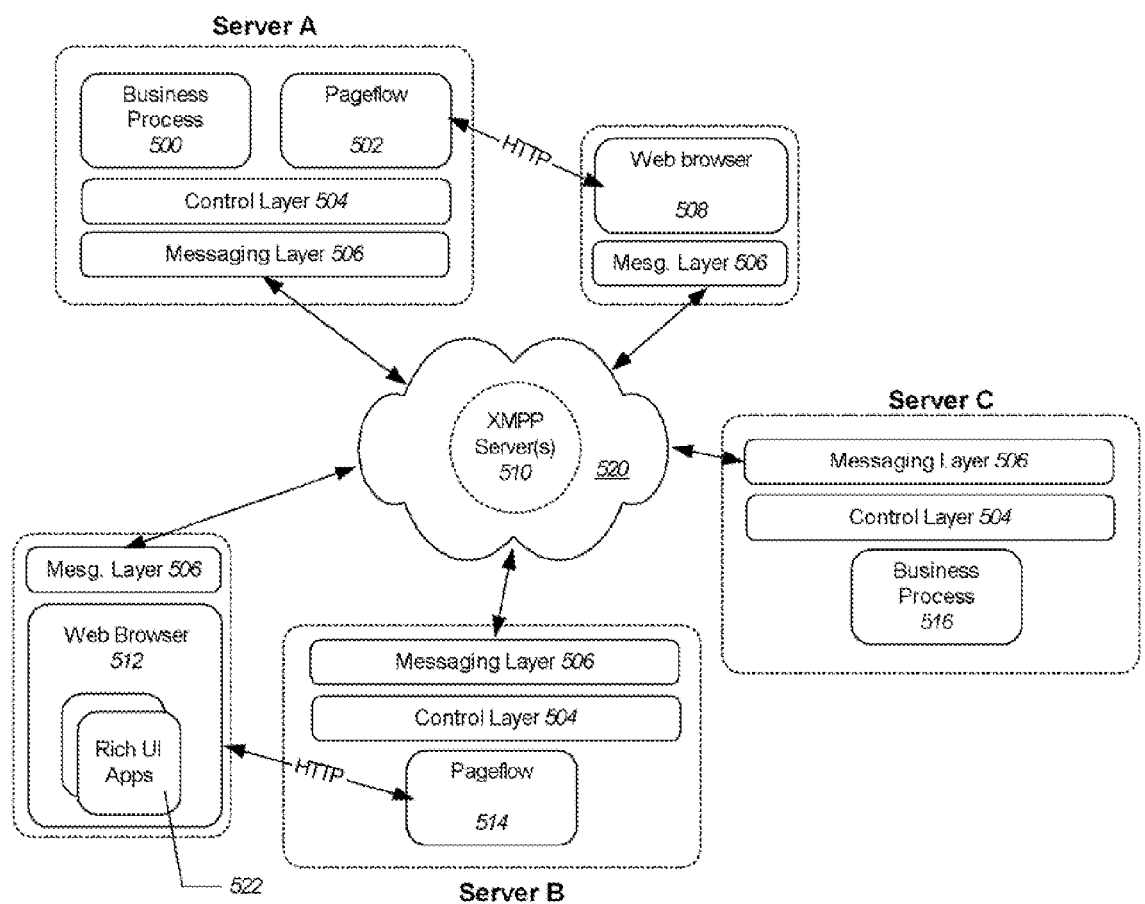
FIG. 5 is an exemplary illustration of scenario participants in various embodiments of the invention.

FIG. 5 is an exemplary illustration of scenario participants in various embodiments of the invention. Although this diagram depicts processes and components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

In various embodiments and by way of illustration, scenario participants can communicate with one another over one or more networks 520 using a messaging layer 506. In aspects of these embodiments, communication providers (not shown) upon which the messaging layer is based can optionally utilize one or more XMPP-based IM servers 510 to exchange messages and propagate presence information. In this illustration, there are two collaboration process represented by business processes 500 and 516, and two client processes represented by web browsers 508 and 512.

Although not required, a client process's user interface can be driven by a pageflow (which executes on a server). Here, browser 508 is being driven by pageflow 502 on Server A whereas browser 512 is being driven by pageflow 514 on Server B. In aspects of these embodiments, pageflows and browsers can communicate using the Hypertext Transfer Protocol (HTTP) and/or the secure version of HTTP, HTTPS. Since browsers can communicate both with HTTP and the messaging layer, the messaging layer makes it possible for a web browser to receive data outside of the HTTP stream.

In various embodiments, a business process can be initiated by a pageflow or by an HTTP request from a browser. In the later case, the URI of the request is examined at the server which is communicating with the browser to determine if it matches a predefined URI corresponding to a business process. If so, the server can initiate the business process on behalf of the browser. The newly started business process can than, by way of a non-limiting illustration, redirect the browser to an appropriate pageflow corresponding to an end-user application required by the business process.

Impersonation is the ability for parts of the system to perform operations on behalf of a user. This notion is similar to the notion of a user in Unix®-based operating systems. Unix® processes for purposes of security and permissions execute with the privileges of a specific user, typically the user that started the process. Privileges (also called entitlements) govern what a user can and cannot do on a system. This scheme prevents a process started by a user from performing operations which the user would not be entitled to (e.g., deleting all of the files in a file system, rebooting the system, etc.). Here, a given collaboration process may interact with one or more client processes wherein each client process was started or is "owned" by a particular user. In order for a collaboration process to perform certain operations as a given user, it can execute a command that instructs the system that it will be performing operations in accordance to the privileges of the user. In this way, a collaboration process can "impersonate" different users in the course of servicing client processes and thus maintain the integrity of the system.

Business processes can communicate with other business processes, pageflows, and client processes (e.g., web browsers), whether or not they are reside on the same or a different computing device from the business process. Likewise, pageflows can communicate with business processes and clients, whether or not they are reside on the same or a different computing device from the pageflow. Scenario participants can also communicate in an asynchronous fashion since the messaging layer allows communication has direct support for this. One upshot of this feature is that information can be transferred from collaboration processes to client web browsers without the need for HTTP (which is a synchronous protocol) and without causing client browsers to refresh or reload a web page.

In aspects of these embodiments, scenario participants can utilize controls in the control layer 504 to assist them in accomplishing their tasks. Although the following discussion illustrates control functionality according to different control types, it will be appreciated that such functionality can be combined into fewer controls or spread across a greater number of controls without deviating from the scope and spirit of the present disclosure.

In various embodiments, a message control can provide a high-level and simplified means for interacting with the messaging layer API. In aspects of these embodiments, the message control can automatically obtain a participant identifier ("participant id") for each client a collaboration process is attempting to communicate with. In various embodiments, participant ids are used by participants involved in a scenario in order to identify one another. By way of a non-limiting illustration, participant ids can be assigned to web portal users and to application servers. In aspects of these embodiments, participant ids can be drawn from and returned to a pool data structure to facilitate their reuse. In other embodiments, participant ids can be more "permanent" in nature when transports such as Simple Mail Transport Protocol (SMTP) are used. For SMTP, a participant id can equate to an e-mail address. Hence, the participant ids will not be transient in nature, as e-mail addresses rarely change. In aspects of these embodiments, a participant id can have an associated password and a status. Status can refer to the status of the participant id at the time of its creation. This can be used to base decisions that depend on presence information.

Referring again to FIG. 5, a client can itself contain one or more client processes, referred to as "Rich UI" applications 522 ("Rich UI" stands for "Rich User Interface"). In various embodiments, an application identifier ("application id") can be assigned to each client process and to each collaboration process. In aspects of these embodiments, a combination of a participant id and an application id can be used to specify a destination (i.e., a "routing id") for a scenario message:

<Routing id>=<Participant id>+<Application id>

Figure 6:
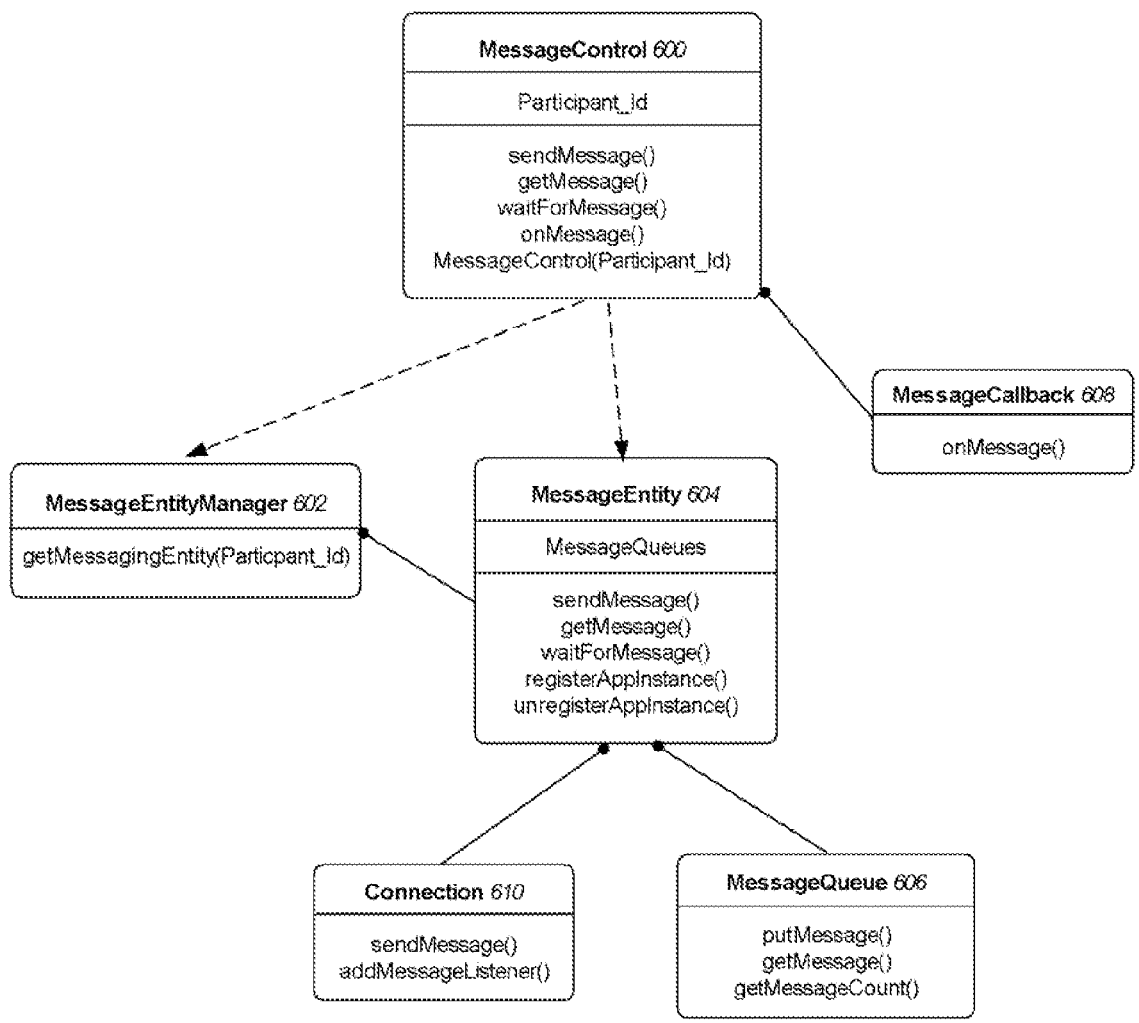
FIG. 6 is an class diagram of an exemplary message control in various embodiments of the invention.

FIG. 6 is an class diagram of an exemplary message control in various embodiments of the invention. A MessageControl 600 can be used by participants to send and receive messages. It depends on a MessageEntity 604 instance that can be obtained from a MessageEntityManager 602 using a participant id. Upon creation, a MessageControl can use the MessageEntityManager to get the MessageEntity assigned to it. It can then register its application id and a MessageCallback 608 implementation that can be used for asynchronous message delivery back to the MessageControl.

In certain of these embodiments, since the MessageControl can be used within a collaboration process that can be at times suspended and/or serialized, the MessageControl only maintains a Participant id object as a member variable (i.e., to store a participant_id and associated information), and uses it to access its associated MessageEntity in a transient manner.

The MessageControl can use the MessageEntity to directly send and receive messages. Synchronously reception of messages can be performed with a timeout parameter such that the operation will not block indefinitely if there is no message available for receiving. To asynchronously receive messages, the MessageCallback can be used. A waitForMessage method on the MessageControl can serve as the registration method for the callback. The MessageControl in turn can invoke waitForMessage on the MessageEntity, which configures the MessageEntity to use the registered MessageCallback when a new message arrives for a particular application id. This callback can then trigger the MessageControl to callback into the calling process. The MessageEntity uses a Connection 610 object to interact with the messaging API for sending messages and registering callbacks.

In certain of these embodiments, when a callback is not currently registered with the MessageEntity for a collaboration process and a message arrives from the messaging layer, the message can be put in a Message Queue 606. Subsequent attempts to synchronously or asynchronously receive messages can consume messages from this queue.

Figure 7:
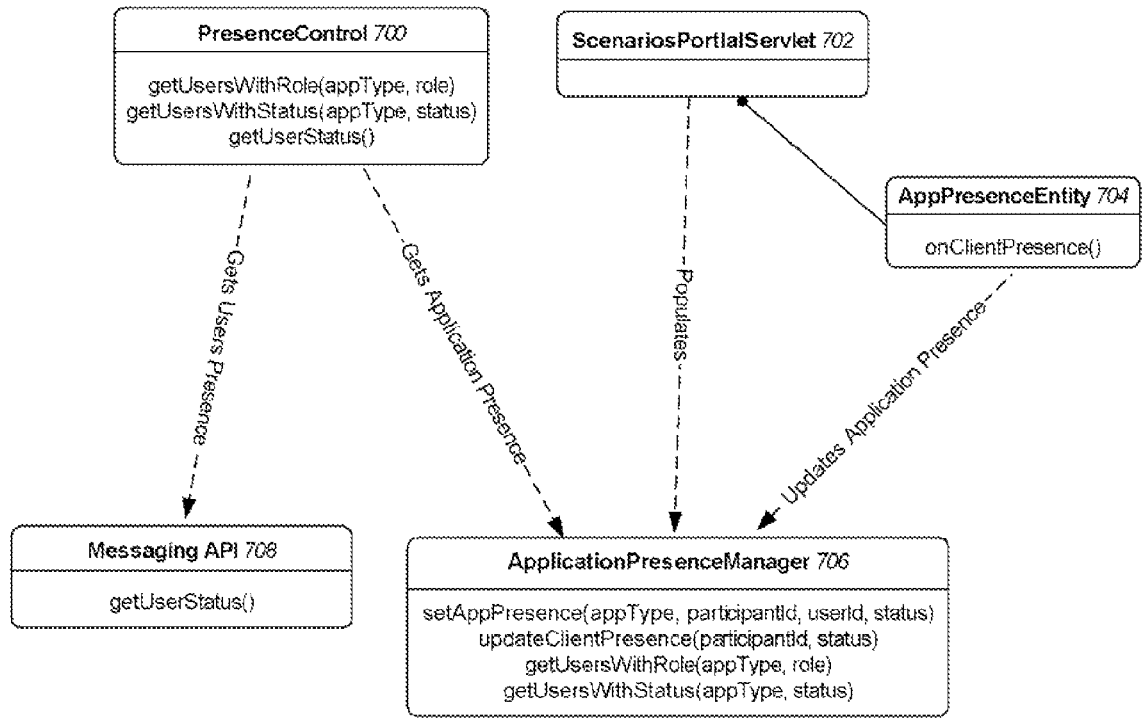
FIG. 7 is a class diagram of an exemplary presence control in various embodiments of the invention.

FIG. 7 is a class diagram of an exemplary presence control in various embodiments of the invention. A PresenceControl 700 can provide application and user presence information to participants. In aspects of these embodiments, an ApplicationPresenceManager 706 instance is responsible for maintaining the current presence status of all scenarios. ScenariosPortalServiet 702 is responsible for populating the ApplicationPresenceManager with associations between a participant end-user identifiers (e.g., a web portal user's login name), participant ids that are associated with a given end-user, and application types that are currently available for a given participant id. In various embodiments, the ScenariosPortalServlet can be a servlet/process/thread that examines HTML responses destined for an end-user to determine what application types are available/present for that end-user. Such responses can contain instructions to initiate, render and/or interact with applications that have a presence in the end-user's web browser or other client process. In one embodiment, ScenariosPortalServiet or other part of the system can also track application status by examining HTML responses to determine when applications go into and out of scope (i.e., are active or suspended) for a given client process. By way of illustration, if an application is rendered in a first response, but not in a subsequent response, the status of the application would have a "suspended" status (i.e., not "active") since it is no longer on the current web page. In still other embodiments, application type and status information can be obtained from client processes which tell the messaging layer which applications are present and what their status is. This information can be relayed or broadcast to other participants so that all participants are apprised of any changes.

The information in the ApplicationPresenceManager can be updated by an AppPresenceEntity 704 instance, which can be associated with the ScenariosPortalServlet. For example, the AppPresenceEntity can receive notification from the messaging API (e.g., via a callback) when an application is no longer present so that the ApplicationPresenceManager can be updated to reflect this. In various embodiments, the AppPresenceEntity can receive notification of the application types associated with a particular client process and update the ApplicationPresenceManager accordingly.

The PresenceControl depends on the messaging API directly to support a getUserStatus method that provides that presence status of a given user. The PresenceControl also depends on the ApplicationPresenceManager for obtaining application presence information. The get UsersWithRole method of the PresenceControl allows a collaboration process to obtain a list of available users with a particular role that have an active application matching appType. This is useful for finding lists of appropriate collaboration candidates based on a role and an application type. Another variant is also provided, getUserStatus, which can be used to determine the real-time status of a user based on providing a participant id and an application type.

In various embodiments, a scenario control can provide an abstraction for scenario-related activities, including scenario session creation and finalization, participant and group binding, and access to shared state. A scenario session is a logical run-time context for participants engaged in a scenario. A session can be established during any stage of a scenario, but is typically created at the early stages. A scenario session does not necessarily equate with an HTTP session or portal login session. There may be cases where there is no portal login session (anonymous user) or where multiple scenario sessions occur within the span of a HTTP session.

The scenario session provides a shared state mechanism that allows participants in the session to easily share information. In aspects of these embodiments, a session can be implemented as a persistent map. Scenario sessions are similar to HTTP sessions or HTTPServletRequests in that they can be used to store and get object attributes that are accessed by a string identifier key. All participants in a session may populate and retrieve these session attributes, though in aspects of these embodiments the total visibility of attribute data can depend on entitlement information that is set by the actor who creates the attribute.

Each session is assigned a unique id that can be used in other contexts to obtain the session instance. Any participant can attach to a session, however in various embodiments a session will persist until all participants have detached from it. In still further embodiments, a session can automatically free its resources when the system detects that its attached participants no longer exist or are inactive. In aspects of these embodiments, when a participant detaches from a session, any other participants who are attached to the session can be notified so that they have the opportunity to detach from it or take other action.

In various embodiments, a scenario control can provide the following functionality:
  Create a scenario session and provide a corresponding scenario session id.
  Attach to and detach from a scenario session.
  Store, retrieve and delete shared state values.
  Bind a default participant.
  Assign a participant id to a participant.
  Provide a participant id to be used by the MessageControl for messaging activities.
  Provide a set of parsed input arguments that can be used within the scenario. These arguments can come from the HTTP request that originated the business process.
  Bind a Scenario User to a Scenario alias.
  Bind a Scenario Group to a Scenario group Alias.

In various embodiments, shared state functionality can be surfaced as a shared state control that uses an identifier to access a persistent map containing the shared state data. The control allows participants to have access to and share a common set of information within a scenario session. For example, if a scenario is built around the concept of a document review process, one component of the shared state could be a reference to a document in a content management system. In aspects of these embodiments, the shared state control supports a persistent collection functionality that allows participants to associate serializable objects with string keys. Participants reference a scenario session id that is used by the control to locate and load the appropriate persistent map.

By way of illustration, business processes will typically populate a session's shared state, while pageflows will typically consume from that shared state to render information associated with the shared state into an HTML document. Other entities can also use the shared state control as long as they have a means to obtain the session id. This could be useful for handling asynchronous data requests from a client process that retrieves data out-of-band using the messaging layer rather than performing an HTTP request.

In various embodiments, a shared state control can provide the following functionality:
  Bind the control to session based on a session id.
  Create a scenario session and provide a corresponding scenario session id.
  Attach to and detach from a scenario session.
  Store, retrieve and delete shared state values.
  Returns a set containing all current value keys.

Shared states can be persisted for the entire lifecycle of a collaboration process and can be accessible from any node in a server cluster for fail-over and load-balancing purposes.

In various embodiments, the shared state control can be used to manipulate references to documents and lifecycles in a content repository or a content management system. This allows shared information to live longer than a scenario session since it resides in a separate system. Content repositories can relate structured content and unstructured content (e.g., digitally scanned paper documents, XML, Portable Document Format, HTML, electronic mail, images, video and audio streams, raw binary data, etc.) into a searchable corpus. Content repositories can be coupled to or integrated with content management systems. Content management systems can provide for content life cycle management, versioning, content review and approval, automatic content classification, event-driven content processing, process tracking and content delivery to other systems.

In various embodiments, clients can support end-user interaction with one or more collaboration processes. In aspects of these embodiments, the client process can also provide a user interface. By way of a non-limiting example, a user interface can include one or more of the following: 1) a graphical user interface (GUI) (e.g., rendered with Hypertext Markup Language) rendered on a display device or projected onto a user's retina; 2) an ability to respond to sounds and/or voice commands; 3) an ability to respond to input from a remote control device (e.g., a cellular telephone, a PDA, or other suitable remote control); 4) an ability to respond to gestures (e.g., facial and otherwise); 5) an ability to respond to commands from a process on the same or another computing device; and 6) an ability to respond to input from a computer mouse and/or keyboard. This disclosure is not limited to any particular UI. Those of skill in the art will recognize that many other user interfaces are possible and fully within the scope and spirit of this disclosure. In aspects of these embodiments, one such user interface can be rendered with the aid of a web browser, such as Microsoft® Internet Explorer, available from Microsoft® Corporation of Redmond, Wash.

In one embodiment, a client process can be implemented using a minimalist JavaScript/applet. This embodiment can use a combination of a Java® applet and JavaScript functions embedded within a web page to enable collaboration functionality. Applets can send and receive messages via the messaging layer. When a scenario message arrives, an applet can call a JavaScript function on the page to handle the message. JavaScript embedded in the page can be responsible for all user interface updates, user interaction, data handling and sending messages (through the applet). One advantage of this approach is that it does not require modification of the web browser.

In another embodiment, a heavy-weight client can be downloaded and run within or in conjunction with a web browser that has been augmented with a browser helper or plug-in for this purpose. The client-side programming model could include client-side pageflows and a rich set of capabilities for executing entire applications, potentially consisting of many pages without interaction with a server. Asynchronous communication would allow bi-directional notification of events necessary for scenarios. Clients could take advantage of persistent or semi-persistent data storage. User interface elements within clients could be represented using controls and could be bound to local data storage (either directly or indirectly through a script). Reusable controls would maximize code reuse and streamline application development.

In yet another embodiment, a light-weight client can be downloaded and run within or in conjunction with a web browser that has been augmented with a browser helper or plug-in for this purpose. A browser helper to work with Dynamic HTML (DHTML) and JavaScript embedded on the page to provide asynchronous communication and user interface data binding to a client data store. The client-side programming model would not include client-side pageflows. A collaboration process would be able to push new JavaScript down to the browser without forcing a page reload, and the client would be able to show multiple "pages" of content by activating different DIV sections in the HTML document. A Document Object Model (DOM) of the user interface elements within the client can be used to read and manipulate the user interface elements. Data can be bound from a local data store to DOM properties as needed.

Figure 8:
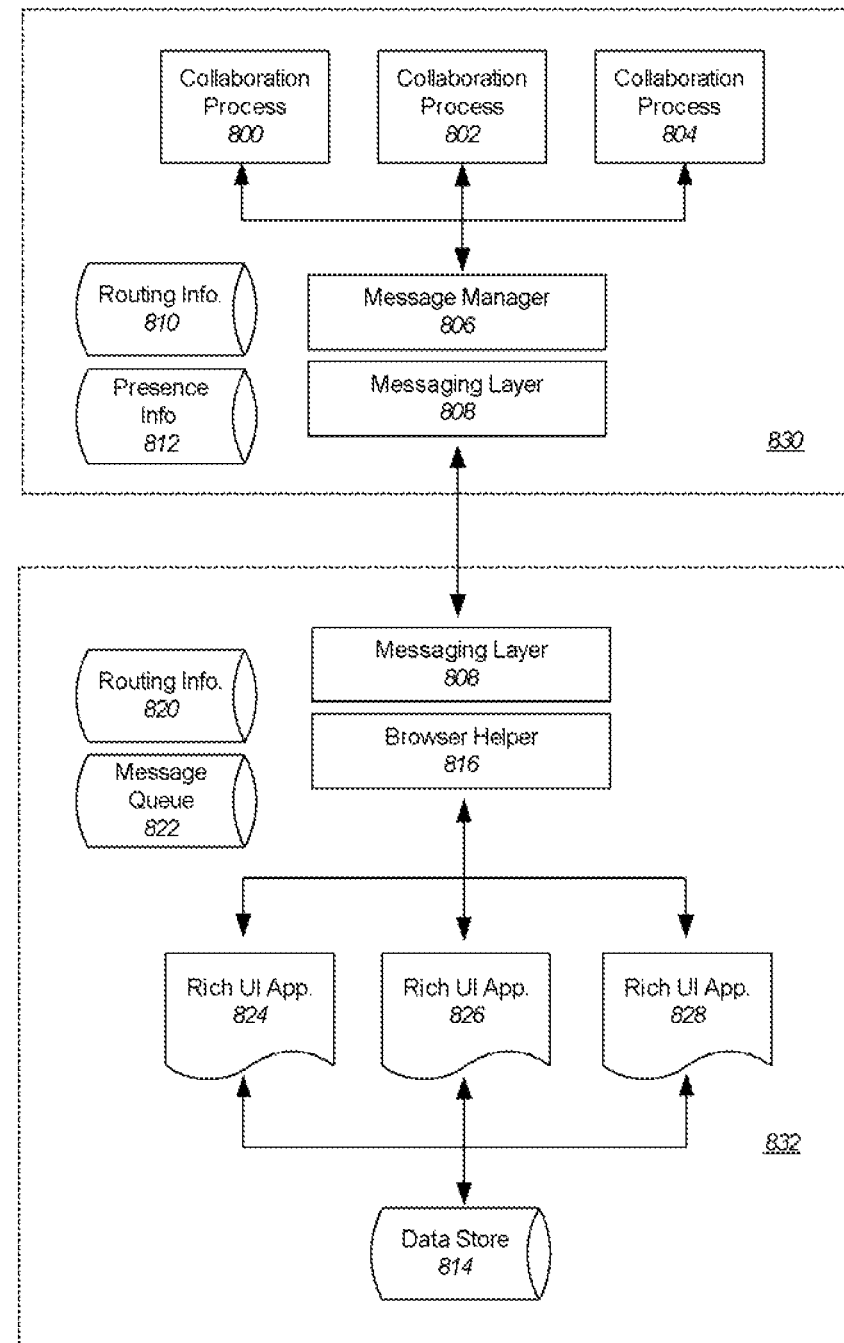
FIG. 8 is an exemplary illustration of a web browser and an application server in various embodiments of the invention.

FIG. 8 is an exemplary illustration of a web browser and an application server in various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

In this illustration, application server 830 includes collaboration processes 800, 802 and 804, all of which can execute simultaneously. Client web browser 832 includes one or more Rich UI clients 824, 826 and 828, which are also capable of executing simultaneously. Communication between participants is supported by the messaging layer 808. As previously discussed, the messaging layer provides an extensible communication platform that allows different communication providers to provide services to participants in an uniform manner. Although not depicted in this figure, messaging providers allow participants to utilize multiple and different underlying communication channels.

In aspects of these embodiments, collaboration processes register with a message manager 806 in order to send and receive messages via the messaging layer. After registering, the message manager can provide routing information to a collaboration process which it can then provide to any participant that wishes to communicate with it. In aspects of these embodiments, the routing information can be embedded in a response to the first request a client makes to the collaboration process. The routing information can include the routing id for the collaboration process and any other information that would be required by a participant to establish communication with it. In further aspects, the routing information can include the name of an XMPP server and an IM identifier to use for the server. For message routing purposes, the message manager can maintain associations between the routing ids of client processes and their corresponding Universal Resource Identifiers (URIs) in a temporary or persistent map 810. In aspects of these embodiments, the message manager can populate the map as it receives messages from participants (e.g., obtaining the source URI from the messaging layer and the source routing id from the message itself). The map can be used by the message manager to look up a participant's URI when sending it a message.

The message manager accepts outgoing messages from the collaboration processes and provides them to the messaging layer. The message manager can construct a message based on a collaboration process's routing information, the destination participant's routing information (e.g., obtained from the presence control or from the messaging layer API), and the message contents. In aspects of these embodiments, the default communication provider can be used to send the message. In further aspects, the default communication provider can send the message through the XMPP server that the destination participant is using. The message manager can also accept incoming messages from the messaging layer and route them to the appropriate collaboration process(s).

In various embodiments, the message manager can instantiate messaging layer communication providers as part of its initialization. Configuration information can be supplied to each provider, such as an XMPP server address and an IM identifier to use when connecting to that server. Those of skill in the art will appreciate that this disclosure is not dependent on or limited to any particular means for conveying configuration information and that many such ways exist and are fully within the scope and spirit of the present disclosure. The configuration information can also designate one provider as the default transport.

In various embodiments, a web browser helper 816 (e.g., a browser plug-in or other suitable means for providing asynchronous communication and displaying information) can facilitate asynchronous communication between Rich UI and collaboration processes. The browser helper allows collaboration processes to push content to web browsers without causing an the current web page to reload, for example. The browser helper functions similarly to the message manager on the server in that it can route messages to/from Rich UI clients and can initialize the messaging layer. In aspects of these embodiments, the browser helper is exposed to its host browser's script engine so that it will be invoked when a Rich UI enabled page is loaded or when a message needs to sent.

By way of illustration, a Rich UI client might receive an initial set of data records to display from a collaboration process, and when the dataset changes the collaboration process can send the updated data to the Rich UI client. When the updated data arrives, the Rich UI client can update its user interface to incorporate the data. In various embodiments, a graphical user interface can be updated in place by using DHTML. A collaboration process may also choose to send executable code (e.g., instructions) to the client if, for example, an end-user needs to be notified of some event. In aspects of these embodiments, the collaboration process can generate a custom JavaScript function to highlight something on the end-user's web page, or display an alert box, and then send the code to the Rich UI client asynchronously with instructions to execute that function.

In aspects of these embodiments, the browser helper can exchange messages with the collaboration processes using routing information 820. Those of skill in the art will appreciate that this disclosure is not dependent on or limited to any particular means for conveying routing information and that many such ways exist and are fully within the scope and spirit of the present disclosure. For message routing purposes, the browser helper can maintain associations between the routing ids of collaboration processes and their corresponding Universal Resource Identifiers (URIs) in a temporary or persistent map 820. In aspects of these embodiments, the browser helper can populate the map as it receives messages from collaboration processes (e.g., obtaining the source URI from the messaging layer and the source routing id from the message itself). The map can be used by the browser helper to look up a collaboration process's URI when sending it a message.

When it receives a message, the browser helper can extract routing information from the message and invoke a Rich UI client (e.g., via a script method) with the message body and the routing information of the participant that sent it. In further aspects of these embodiments, the browser helper can use an open-source C++ XML parsing library, called XPath, to parse incoming messages. In aspects of these embodiments, Rich UI clients can be represented as scoped JavaScript methods and DHTML display components. Each Rich UI client has its own application id and is aware of the application id of the collaboration process with which it is communicating. A given Rich UI client can communicate with more than one collaboration process and vice versa. To respond to a message, a Rich UI client can invoke a method on the browser helper and provide it the message body and the routing information of the destination participant. The helper then constructs a message based on this information, and sends it through the messaging layer to the destination participant.

In various embodiments, messages sent between the participants can contain any information in any format and using any protocol. In aspects of these embodiments, XML fragments can contain routing information along with an information payload destined for the participant. In further aspects of these embodiments, the routing information can include the application id of the source and, in some cases, the IM identifier used by that application. The payload can contain a type field indicating to the destination participant the type of information contained in the message.

Figure 9:
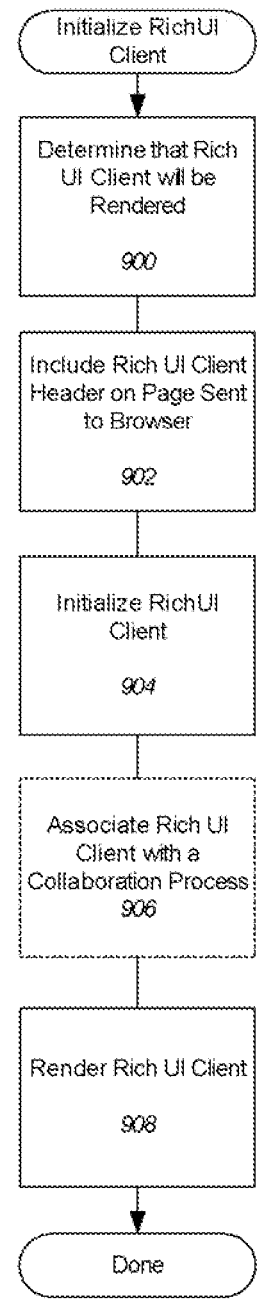
FIG. 9 is a flow diagram illustration of Rich UI client initialization in accordance to various embodiments of the invention.

FIG. 9 is a flow diagram illustration of Rich UI client initialization in accordance to various embodiments of the invention. Although this figure depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways.

In step 900, it is determined that a Rich UI client will be rendered on a web page that will be sent to a web browser. (Note, there may be more than one Rich UI client on a given page in which case the steps in this flow diagram can be performed for each such client.) Once this determination is made (e.g., by detecting use of JSP tags or other evidence), the system can include or "embed" information on the page to assist the Rich UI client in initializing in step 902. In aspects of these embodiments, this information can include some or all of the parameters described in Table 2. This information, called a "Rich UI Header", can be included once for each Rich UI client on a given page.

TABLE 2

Exemplary Rich UI Header Information in Various Embodiments

| PARAMETER | DESCRIPTION |
| --- | --- |
| Application ID | The application id to be assigned to the Rich UI client. |
| Collaboration process Routing Id (Optional) | The optional routing id of a collaboration process that the Rich UI client should associate itself with. |
| Seed Data (Optional) | Optional seed data needed for the Rich UI data store. |
| Communication Protocol (Optional) | An optional protocol to use for communication (e.g., XMPP). |
| Communication Protocol-Specific Configuration (Optional) | Optional information specific to the communication protocol being used (e.g., the name of the XMPP server, the identity and password to use for the XMPP server). |
| Timeout Period (Optional) | An optional period of time the browser helper should wait before timing out and closing a scenario session and/or releasing any resources dedicated to communication with other participants. |

When this page is received by the web browser, the Rich UI client can be initialized by the browser helper in step 904. This may entail initializing the messaging layer based on the provided communication protocol and configuration parameters. If a timeout period is specified, it will determine the period of inactivity that must elapse before the browser helper closes any open communication sessions and/or detaches from a scenario session. In aspects of these embodiments, valid activity can include end-user interaction with a web browser or other user interface, web browser activity (e.g., page loads, refreshes, redirects, etc.) and application/framework messages sent or received. In addition, if seed data is present it can be placed in the data store 814 which is accessible by the browser helper and all Rich UI clients. If a collaboration process routing id is present, the newly initialized Rich UI client can be associated with it in step 906. Finally, the Rich UI client can be rendered with a web browser in step 908.

In aspects of these embodiments, once initialized a Rich UI client is able to receive and send messages via the browser helper. Messages can be encapsulated in an envelope containing source and destination routing ids wherein the destination routing id specifies the messages' ultimate destination. Messages received by the browser helper fall into two categories: application messages and framework messages. Application messages are meant for Rich UI clients whereas framework messages are meant for consumption by the browser helper itself and are used to control the participant. In further aspects of these embodiments, one type of framework message causes the browser helper to terminate all Rich UI clients and detach from any scenario sessions. Framework messages can be received and processed by the browser helper at all times, even if the browser is currently displaying an "off-site" page or is in a page transition.

In various embodiments and by way of illustration, when a page transition occurs on the browser the browser helper allows Rich UI clients to remain attached to their scenario sessions (if any). All application messages received by the browser helper are placed in a queue 822 for later examination. However, any framework messages received during a page transition can be immediately processed by the browser helper. When the new page is loaded by the browser, the browser helper examines it for a participant id. In aspects of these embodiments, the browser helper reacts to the new page as illustrated in FIG. 10.

Figure 10:
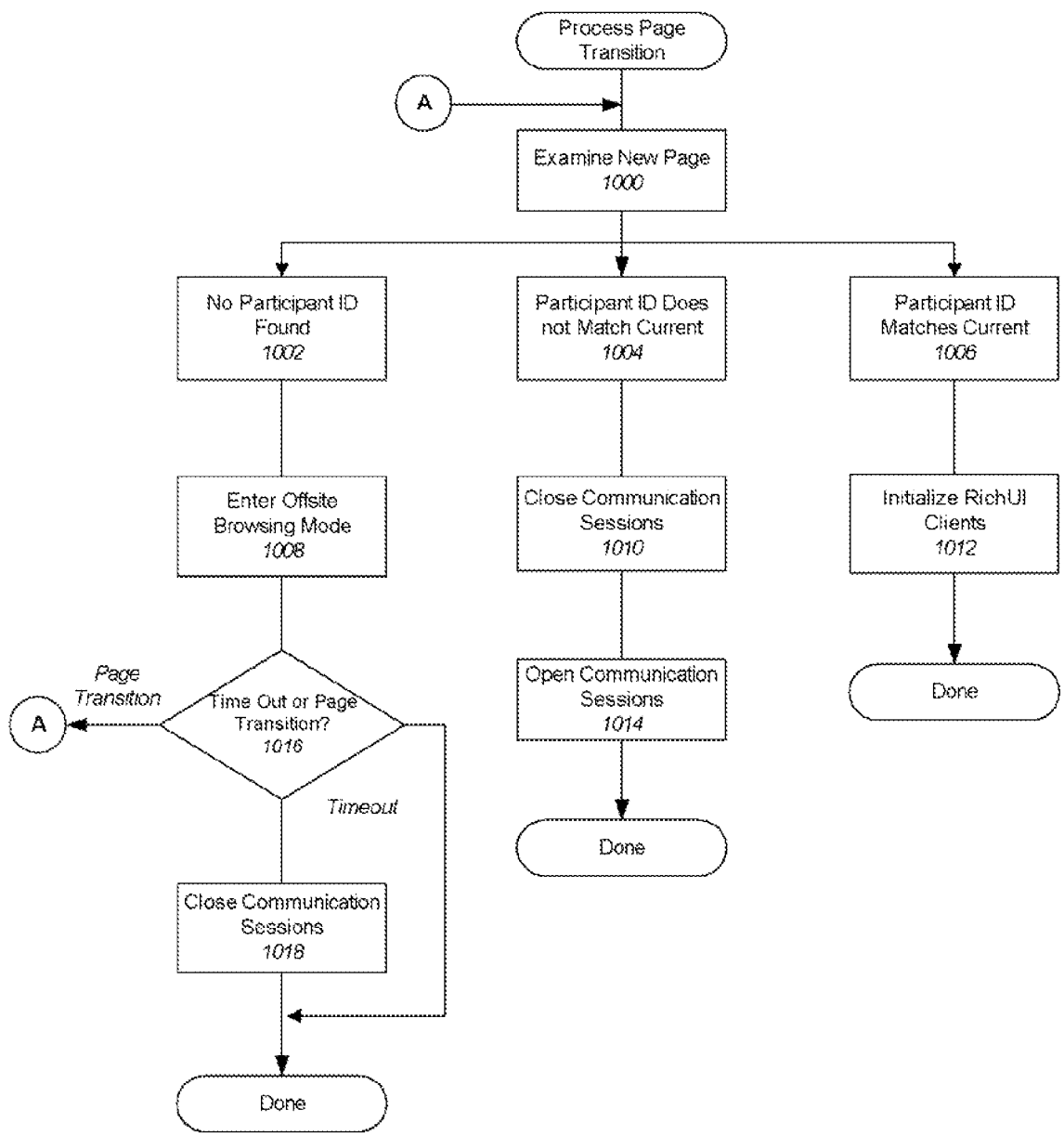
FIG. 10 is a flow diagram illustration of Rich UI client initialization in accordance to various embodiments of the invention.

FIG. 10 is a flow diagram illustration of Rich UI client initialization in accordance to various embodiments of the invention. Although this figure depicts functional steps in a particular order for purposes of illustration, the process is not necessarily limited to any particular order or arrangement of steps. One skilled in the art will appreciate that the various steps portrayed in this FIGURE can be omitted, rearranged, performed in parallel, combined and/or adapted in various ways.

In addition to header information, pages sent to the browser can include the participant id of the web browser on pages that don't contain Rich UI headers so that the browser helper can maintain the state of its Rich UI clients. Upon a page transition, any active Rich UI clients are suspended and the new page is examined in step 1000. If there is not a participant id encoded on the page 1002, the browser helper enters "offsite browsing" mode in step 1008. This can happen if the browser is redirected to an external website unexpectedly or if the user enters a portion of a website that is not enabled for Rich UI. When in off-site browsing mode, the browser helper can maintain any messaging layer communication sessions that its Rich UI clients depend on. All application messages received can be discarded or queued for later processing, but framework messages can be processed immediately.

In step 1016, the browser helper waits for either a page to be loaded into the browser with an embedded participant id or for a timeout to occur. If a page is loaded into the browser with an embedded participant id before the timeout expires, off-site browsing mode is concluded and processing resumes at step 1000. Otherwise, the any messaging layer communication sessions and/or scenario sessions can be closed/detached in step 1018.

Step 1004 applies if the participant id encoded in the new page does not match the participant id currently in use. By way of a non-limiting example, this can happen when a user does not properly leave a web page and manages to browse back to the same page. In this case, any messaging layer communication sessions and/or scenario sessions in use by Rich UI clients can be closed/detached in step 1010. In addition, any messages in queue 822 can be discarded. In step 1014, the browser helper initiates a new messaging layer communication sessions using the information encoded on the new page, if any.

In step 1006, if the participant id encoded in the new page matches the current participant id, the browser helper can examine the new page to determine which Rich UI clients are present. Each client can be initialized in step 1012. Any application messages in queue 822 can then be processed in order of receipt (or in a priority order) by the appropriate Rich UI client(s). In one embodiment, any messages sent to Rich UI clients that are not present on the new page are discarded.

Each client process can be associated with one or more collaboration processes. In aspects of these embodiments, client processes (e.g., Rich UI processes) have a state that governs their behavior to some extent. By way of illustration, exemplary states are described in Table 3 below.

TABLE 3

Exemplary Client Process States in Various Embodiments

| STATE | DESCRIPTION |
| --- | --- |
| Unloaded | Unloaded client processes may be rendered (e.g., in a browser window), but are not ready to send or receive messages. |
| Active | Active client processes may exchanges messages with any participant, including local client processes (e.g., other Rich UI clients in the same web browser).<br>In aspects of these embodiments, an active Rich UI client process can have a lifespan exceeding a single web page, although it is considered "active" if it is currently rendered on a page Active Rich UI client processes are embedded in the web page currently being displayed in the web browser. |
| Suspended | A suspended client process cannot send or receive any messages and is not presently rendered.<br>In aspects of these embodiments, a suspended Rich UI client process is not displayed on the current browser page but was previously displayed on another page. It cannot affect any UI changes or perform communication functions. Suspended Rich UI client processes can resume normal operations if and when they are placed on the current web page. |

In various embodiments, Rich UI clients in the same web browser can send and receive messages to each other. In one embodiment, this can be accomplished by adding loop-back functionality to the messaging layer wherein the messaging layer can detect if a routing id is local (i.e., identifies a Rich UI client in the messaging layer's process space). Messages whose destination routing id is local are "looped back" to the browser by delivering the message to the local destination Rich UI client without sending the message over a channel. In another embodiment, the browser helper itself can catch local communication and redirect it before it reaches the messaging layer. From a participant's point of view, there need be no discernable difference in the communication mechanism for local communication.

In various embodiments, when a client process is in the active state it may also be considered "associated" or "unassociated". Unassociated client processes are not currently associated with a collaboration process. In one embodiment, they may receive messages from any collaboration process, but cannot send messages to collaboration processes. Unassociated client processes that receive a message from a collaboration process can always choose to associate themselves with the message sender. In various embodiments, associated client processes can be associated with a single collaboration process such that messages sent from the client process are automatically directed (e.g., by a browser helper or other suitable means) to the particular collaboration process. Whether associated or not, a client process may send and receive messages to/from other client processes in the same process space and may receive messages from any collaboration process—not just the one it is associated with.

In various embodiments, the browser helper is responsible for tracking the routing id for the collaboration process for each associated client process (e.g. Rich UI client). In aspects of these embodiments, the browser helper can provide functionality to its Rich UI clients. This functionality can be implemented by the helper in any manner, but in one embodiment can be implemented as callable JavaScript functions the Rich UI client may call and helper-invoked Rich UI client function callbacks. In further aspects, Rich UI client-initiated functionality is represented as a function the Rich UI client may call, and browser helper-initiated functionality can be represented by functions, methods or raised "events" that the helper invokes on the Rich UI client. In various embodiments, client-initiated functionality can include:

The ability to associate a client process with a collaboration client process routing id. This places the client process in the "associated" state. If the client process was previously associated with another routing id, the newly specified routing id becomes the client process's new default communications endpoint.

The ability to remove the client process's association with a collaboration process, if such an association exists. This places the client process instance in the "unassociated" state.

The ability to send a message to the associated collaboration process.

The ability to send a message to another client process in the same process space (e.g., the same web browser).

In various embodiments, browser helper-initiated functionality can include:

Any of the client-initiated functionality.

The ability to initialize a client process instance for the first time, or after its data store has been reset by a collaboration process.

The ability to initialize a client process instance after a page refresh.

The ability to suspended or unload a client process.

The ability to deliver a message sent to a client process sent by a collaboration process or by another client process.

Figure 11:
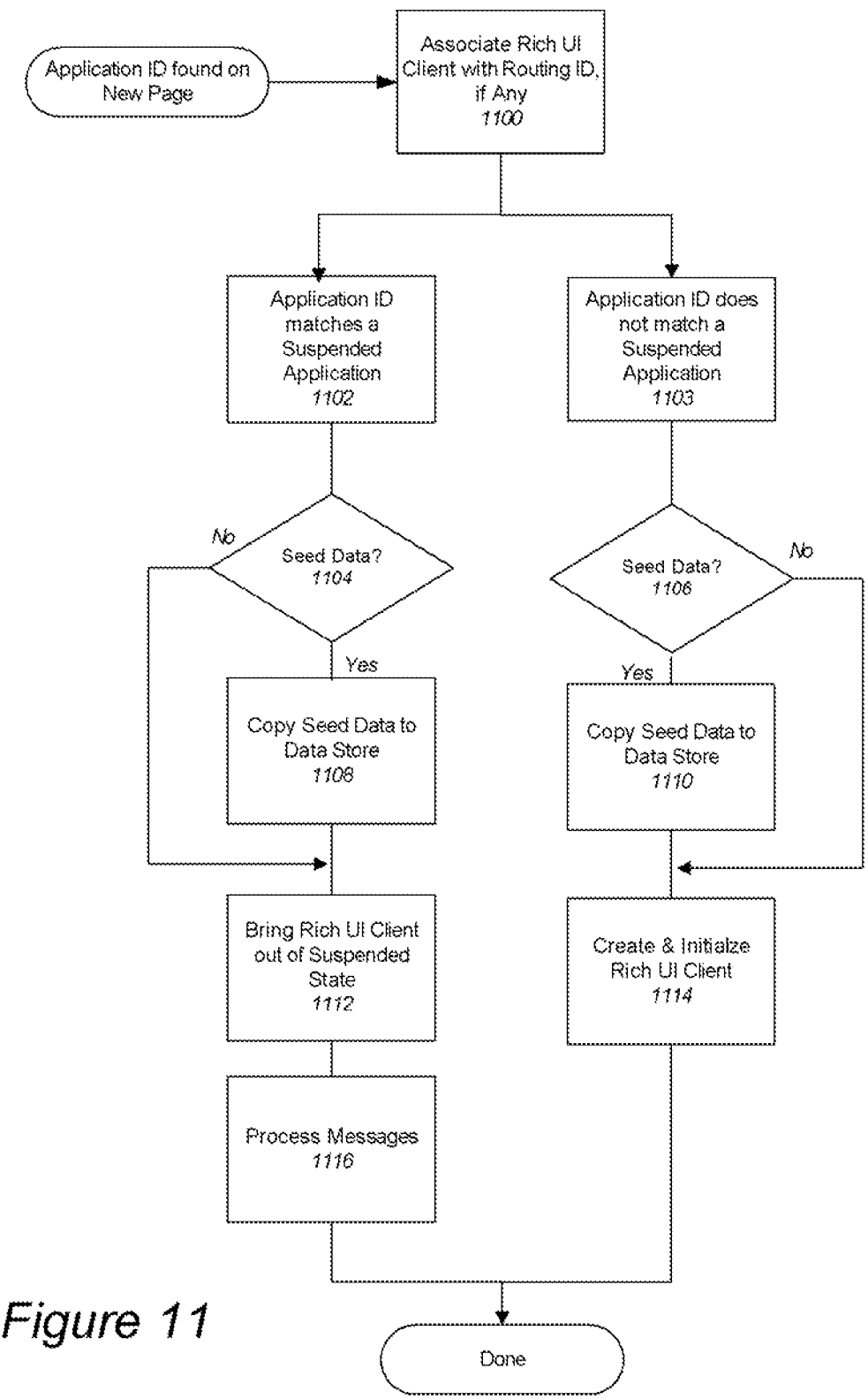
FIG. 11 is a flow diagram illustration of Rich UI client page loading in accordance to various embodiments of the invention.

FIG. 11 is a flow diagram illustration of Rich UI client page loading in accordance to various embodiments of the invention. Although this figure depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways. There may be more than one Rich UI header on a given page in which case the steps in this flow diagram can be performed for each such header. See FIG. 9 and accompanying text.

In various embodiments, when a new page is loaded into the browser, the browser helper is responsible for ensuring that Rich UI clients work properly. In step 1100, if a routing id is found in a Rich UI header, the corresponding Rich UI client will be associated with the routing id. In step 1102, if the application id specified in the Rich UI header matches that of a suspended Rich UI client, then it is determined in step 1104 if the header contains seed data. If so, the data is copied to the data store in step 1108. The copying will replace any preexisting seed data for that client. If not, this step is skipped. In step 1112, the suspended Rich UI client is brought out of suspended state. In step 1116, the now active Rich UI client can then send and receive messages, including any that were queued while the Rich UI client was suspended. In Step 1103, the application ID in the Rich UI header does not match that of a suspended client. In step 1106, it is determined if the header contains seed data. If so, the data is copied to the data store in step 1108. If not, this step is skipped. In step 1114 the Rich UI client is created and initialized.

In various embodiments, the foregoing systems and methods can be used to assemble an unlimited variety of scenarios. By way of illustration, one such scenario is a customer call center. In this application, customer service representatives (CSRs) are tasked with taking calls from customers to perform various actions. One such action is a refund request where the customer wants a refund. In this example, CSRs with less than six months of experience may not process refunds for amounts over $1000.00 without the real-time approval of a manager. Through use of a client process (e.g., a Rich UI client), a CSR can contact a manager in real-time for assistance. Managers also use a client process (e.g., a Rich UI client) called a "helper" client that allows them to be engaged in many "conversations" with many different CSR's. Each conversation is represented by collaboration process that manages CSR-manager connection.

When a CSR client process requests help, a collaboration process is created (if one does not already exit). The collaboration process by using presence information can dynamically locate an available manager running the helper client. In order to communicate with the collaboration process, the manager's helper client can associate itself with the collaboration process's routing id. Because client processes can receive messages from any collaboration process at any time, the collaboration process can send messages to manager helper clients to request help. Individual helper clients can evaluate the request message and choose whether or not to associate themselves with the collaboration process. When the help session is complete, the manager's helper client may disassociate from the collaboration process or re-associate with another as needed.

In aspects of these embodiments, to support client-based decisions about association (or re-association) with a collaboration process, the client is responsible for receiving and evaluating association requests from the server. Because the server may include arbitrary data in the association request sent to the client, there is no standard form for the association request message. Instead, any message received by the client may potentially be an association request, and the client may associate (or re-associate) at its own discretion by invoking the association functionality provided by the browser helper.

Figure 12A:
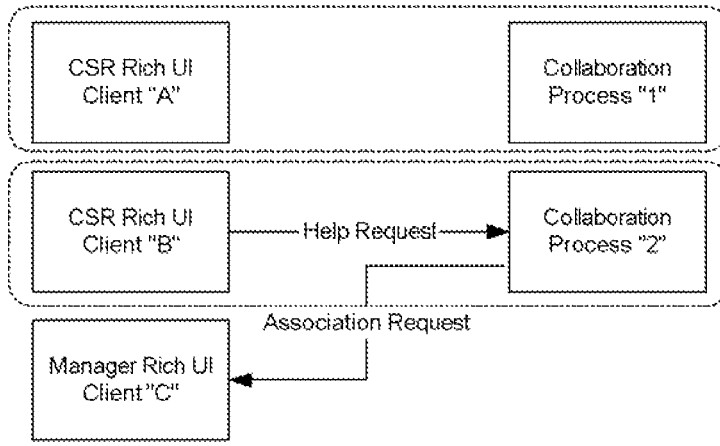
FIGS. 12a-c are exemplary illustrations of a collaborative customer call center scenario in accordance to various embodiments of the invention.
Figure 12B:
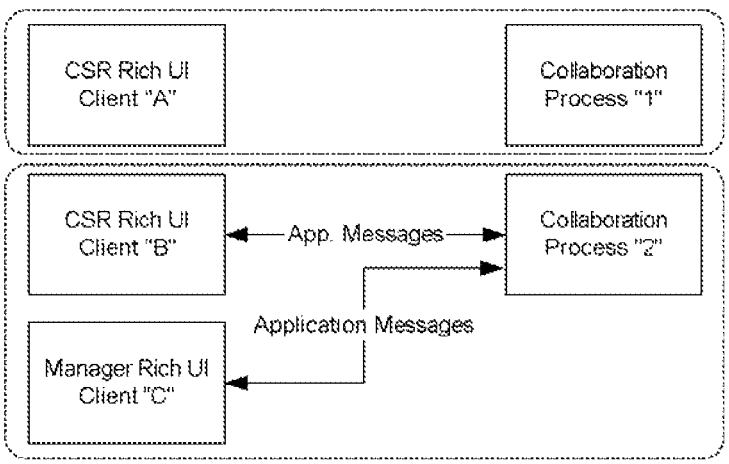
Figure 12C:
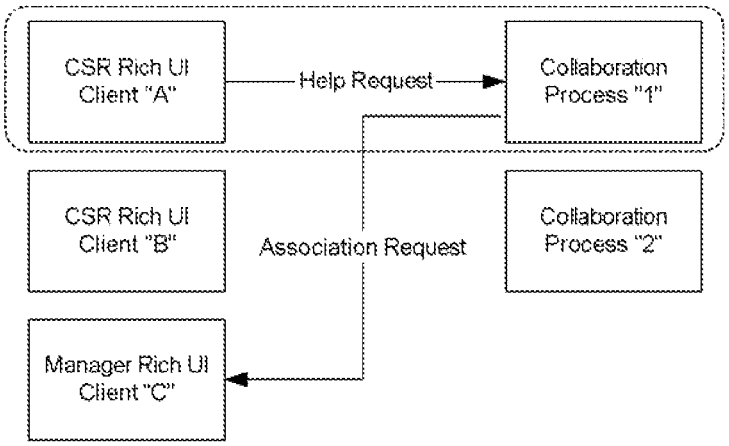

FIGS. 12a-c are exemplary illustrations of a collaborative customer call center scenario in accordance to various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

In FIG. 12a, three Rich UI client clients ("A", "B", and "C") and two collaboration processes ("1" and "2") are illustrated. The dotted line enclosures are used to indicate associations between the two. For example, client "A" is associated with collaboration process "1" whereas client "B" is associated with collaboration process "2". Client "C" is unassociated. Each Rich UI process can share the same web browser or utilize different browsers.

In this scenario, the end-user CSR interacting with client "B" takes a call from a customer. The CSR can gather customer information, including first and last name and some details about the call. This information can be placed in the scenario session's shared state through use of the shared state control. If customer then requests a refund with an amount greater than $1000 and the CSR has less than six months experience, client "B" will attempt to associate with a manager to get approval. In this case, "B" sends a help request (e.g., using the message control) to collaboration process "2". The collaboration process locates available managers using a role that requires a user to be a manager, to have a presence status of "available" and to be running the manager client. In various embodiments, the collaboration process can use a presence control in this endeavor.

The collaboration process then sends an association request to one of the available managers identified by the role using a message control. In aspects of these embodiments, if the manager responds within a certain time frame the manger's status is changed to "busy". If there is no response or a negative response, the collaboration process can send an association request to another of the identified managers until one accepts the request. In one embodiment, the collaboration process can send association requests in any order. By way of illustration, the collaboration process can send association requests to the "least busy" manager first. In another embodiment, the collaboration process can send association requests following an ordering based on one or more properties of the scenario participants. Other schemes are possible (e.g., round robin) and fully within the scope and spirit of the present disclosure.

In FIG. 12b, the manager's client "C" has associated itself with collaboration process "2". Now both clients "B" and "C" are associated with collaboration process "2" as indicated by the surrounding dotted line. At this point, "B" can send its refund request to "C" via collaboration process "2". Using the shared state control, the manger's Rich UI client can examine any pertinent information about the request and then respond affirmatively or negatively to "B" via collaboration process "2". Thereafter, clients "B" and "C" can disassociate from the collaboration process as indicated in FIG. 12c.

FIG. 12c also illustrates that client "A" has requested help from collaboration process "1". ("A" could also have requested help from collaboration process "2".) Collaboration process "1" has, in turn, identified that a manager is present and is also running the manger client. The collaboration process sends an association request to "C". If "C" responds affirmatively to the request, both "A" and "C" will be associated with collaboration process "1" and will thus be able to have a dialog.

By way of a further illustration, another possible scenario is group chat. In this application, users have an active "buddy" list that displays other users with whom they can correspond with. The buddy list also can display each user's status (e.g., "online", "offline", "busy", etc.). The buddy list can also be rule-driven, displaying users according to rules based on presence. For example, a rule might specify that people on a buddy list are present, have an status of "online", and live in the Los Angeles area. Any criteria is possible. A buddy list can be based on a combination of rules and users that have been manually added to the list.

To chat with a second user, the first user selects the second user from their buddy list. The second user is then contacted by a collaboration process to see if they would like to chat. If so, a chat window is activated on both users' browsers (or other suitable applications). The first and/or second user(s) can also bring additional users into the chat by selecting them from their respective buddy lists. The chat window allows users to exchange messages in real-time. In various embodiments, each user sees every other user's messages in their chat window. In aspects of these embodiments, this can be accomplished by sending all messages to a collaboration process which can then broadcast the message to all associated users (i.e., users involved in the group chat).

Since users involved in the chat can be part of the same scenario session, they can all have access to the session's shared state. The shared state control enables users to seamlessly exchange other kinds of information (e.g., sounds, images, video, files, etc.) alongside their messages. In further embodiments, chat users can also share a common view of a web page that can be co-navigated. In aspects of these embodiments, the chat window has a text field or other user interface that allows any of the users to specify a URL. Once specified, the URL can be sent via a collaboration process to all of the users. This will cause the URL to be loaded into each user's common view of a web page.

In various embodiments, group chat is facilitated by a collaboration process that serves to relay a message from one user to the other users in the group. When a chat client process invites a new user to join, it can do so by sending a chat request to the collaboration process which will forward the invitation to the new user (assuming the new user is available and is running a chat client themselves). If the new user declines the invitation, the collaboration process can notify the client process of the failure. Otherwise, the new user associates itself with the collaboration process and thus becomes part of the group chat. At this point, the new user can both send messages to the group and receive messages from other users in the group.

FIGS. 13a-e are exemplary illustrations of a group chat scenario in accordance to various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

Figure 13A:
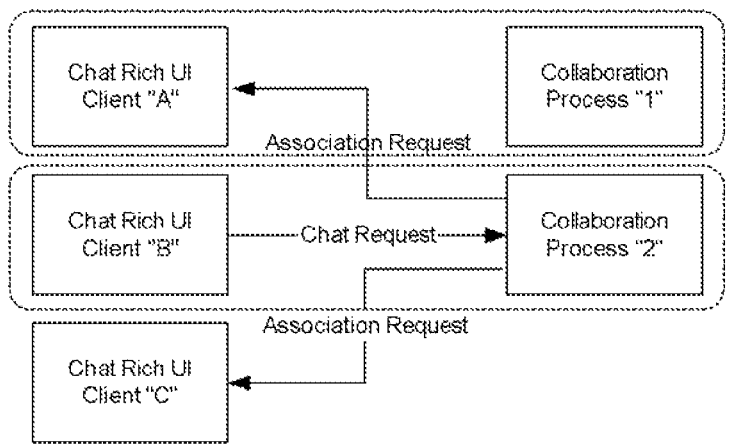
FIGS. 13a-e are exemplary illustrations of a group chat scenario in accordance to various embodiments of the invention.

In FIG. 13a, three Rich UI group chat clients ("A", "B", and "C") and two group chat collaboration process ("1" and "2") are illustrated. The dotted line enclosures are used to indicate associations between the two. For example, client "A" is associated with collaboration process "1" whereas client "B" is associated with collaboration process "2". Client "C" is unassociated. Each Rich UI client can share the same web browser or utilize different browsers.

Figure 13B:
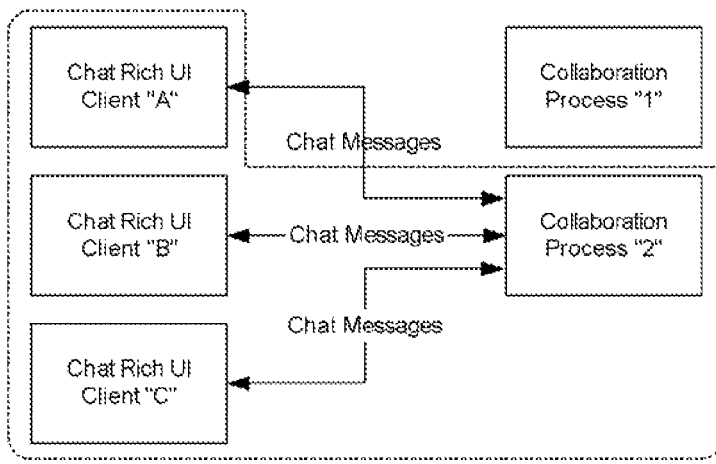

With reference to FIG. 13a, a user interacting with chat client "B" invites two users to chat. This causes client "B" to makes a request to collaboration process "2" to invite the users on its behalf. The collaboration process determines that these users correspond to chat clients "A" and "C". Accordingly, the collaboration process sends association requests to "A" and "C". If there is no response or a negative response from either, the collaboration process can provide notice of such to "B". If one or both of "A" and "C" respond affirmatively, then they will associate themselves with collaboration process "2". This is illustrated in FIG. 13b. Chat messages now sent by "A", "B" or "C" will be forwarded to the others in the group by collaboration process "2".

Figure 13C:
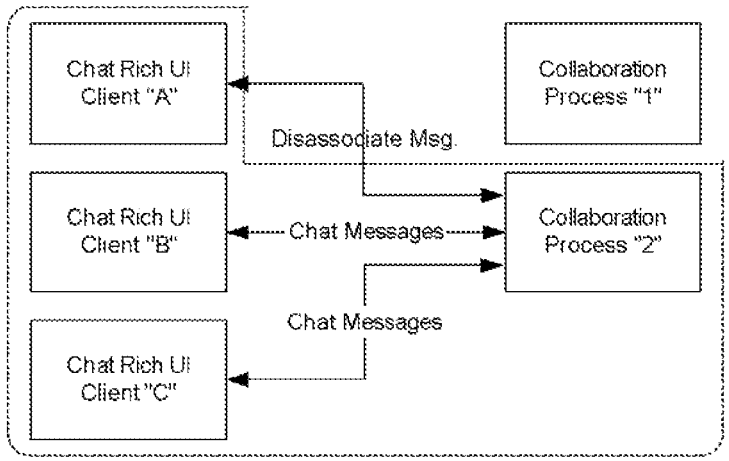
Figure 13D:
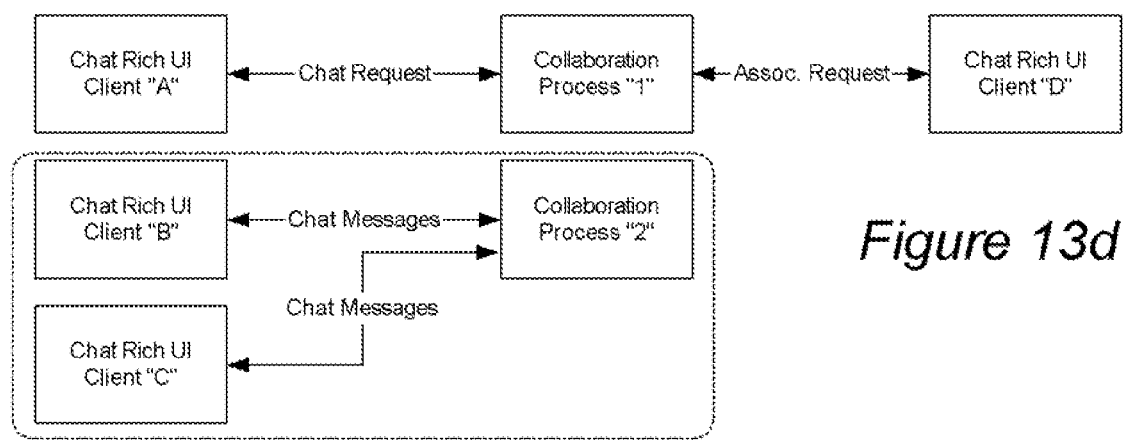
Figure 13E:
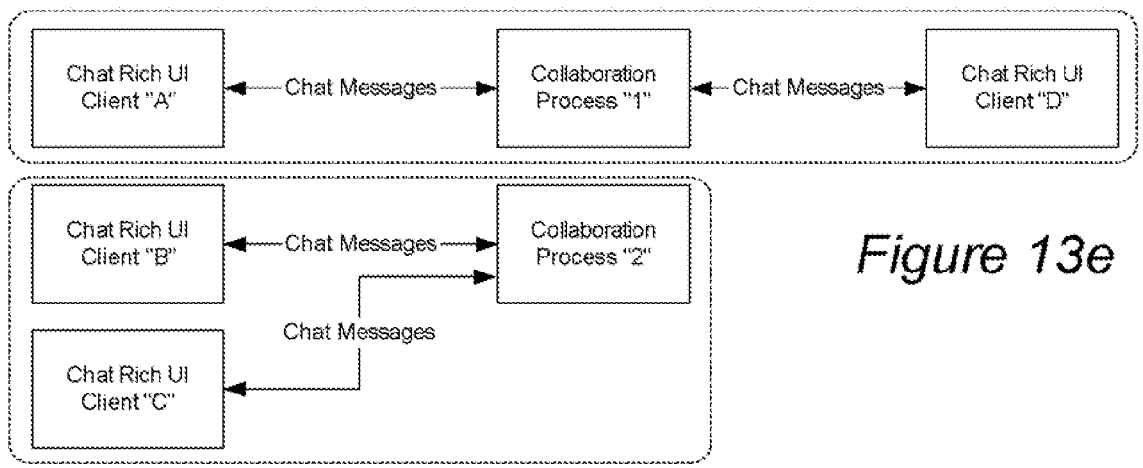

FIG. 13c illustrates client "A" disassociating itself from collaboration process "2". This could be a result of the end-user of client "A" wanting to exit the chat. FIG. 13d illustrates that client "A" is no longer associated with collaboration process "2" and is attempting to invite client "D" into a group chat via collaboration process "1". Client "D" accepts the invitation and both clients associate with collaboration process "1" (FIG. 13e). The group chat directed by collaboration process "2" is independent from the group chat directed by collaboration process "1". In further embodiments, clients can be associated with more than one collaboration process. In this way, a client can participate in more than one group chat.

Various embodiments may be implemented using a conventional general purpose or a specialized digital computer or processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

Various embodiments include a computer program product which is a storage medium (media) having instructions stored thereon/in which can be used to program a general purpose or specialized computing processor/device to perform any of the features presented herein. The storage medium can include, but is not limited to, one or more of the following: any type of physical media including floppy disks, optical discs, DVDs, CD-ROMs, microdrives, magneto-optical disks, ROMs, RAMs, EPROMs, EEPROMs, DRAMs, VRAMs, flash memory devices, magnetic or optical cards, nanosystems (including molecular memory ICs); paper or paper-based media; and any type of media or device suitable for storing instructions and/or data. Various embodiments include a computer program product that can be transmitted over one or more public and/or private networks wherein the transmission includes instructions which can be used to program a computing device to perform any of the features presented herein.

Stored one or more of the computer readable medium (media), the present disclosure includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for purposes of illustration and description. It is not intended to be exhaustive or to limit the invention to the precise forms disclosed. Many modifications and variations will be apparent to the practitioner skilled in the art. Embodiments were chosen and described in order to best explain the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for a collaboration between two or more participants selected from a plurality of participants, comprising:
   initiating a collaboration system having a messaging layer, and operating on one or more microprocessor;
   defining a plurality of roles including at least a first role subject to a first membership criteria and a second role subject to a second membership criteria and a presence criteria;
   providing a subscription feature in the messaging layer whereby collaboration processes of the collaboration system can subscribe to presence information for a particular role of the plurality of roles; and
   monitoring changes in role membership;
   notifying collaboration processes which have subscribed to presence information for the particular roles of the plurality of roles of changes in role membership of the particular role of the plurality of roles;
   qualifying a first participant of the collaboration from the plurality of participants based on the first role, wherein qualifying the first participant includes the collaboration system evaluating the first participant based on the first membership criteria associated with the first role;
   automatically providing a second participant of the collaboration from the plurality participants using the collaboration system, wherein automatically providing the second participant includes automatically selecting the second participant and inviting the second participant to join the collaboration;
   wherein automatically selecting the second participant comprises the collaboration system automatically selecting the second participant based on the second role by dynamically evaluating the plurality of participants based on the second membership criteria and the presence criteria; and
   wherein inviting the second participant to join the collaboration comprises receiving via the messaging layer a request from the first participant at the collaboration system, forwarding the request via the messaging layer from the collaboration system to the second participant selected by the collaboration system, generating a notification from the collaboration system when the second participant is available to join the collaboration, and communicating between the first participant and the second participant using the messaging layer of the collaboration system.

2. The method of claim 1 further comprising:
   accessing, by the second participant, a state from the collaboration system, wherein the state indicates whether the second participant is available to participate in the collaboration.

3. The method of claim 1, further comprising:
   receiving presence information for the plurality of participants from a central repository updated by each of the plurality of participants.

4. The method of claim 1 further comprising:
   establishing a shared state that allows the plurality of participants and the collaboration system to share information;
   permitting access by the first participant to the shared state; and
   permitting access by the second participant to the shared state.

5. The method of claim 1 further comprising:
   basing at least the second role on a plurality of criteria in combination with one of arithmetic and logical expressions.

6. The method of claim 1, wherein the step of providing the second participant further includes:
   automatically choosing, with the collaboration system, a least busy qualified participant from the plurality of participants.

7. The method of claim 1 further comprising:
   communicating between the first participant and the second participant using an Application Programming Interface associated with the messaging layer of the collaboration system, wherein the Application Programming Interface exposes messaging functionality of the messaging layer.

8. The method of claim 1 further comprising:
   impersonating, by the first participant, the second participant for the purpose of performing an action on behalf of the second participant.

9. The method of claim 8 further comprising:
   performing the action, by the first participant, with the same one or more privileges of the second participant.

10. The method of claim 1 further comprising:
    co-navigating a web page by the first participant and the second participant.

11. A system for a collaboration between a plurality of participants, comprising:
    one or more microprocessors;
    a collaboration system that executes on said one or more microprocessors, wherein a plurality of participants communicates with the collaboration system, and wherein the collaboration system includes a messaging layer;
    a plurality of roles defined in the collaboration system wherein the plurality of roles include at least a first role subject to a first membership criteria and a second role subject to a second membership criteria and a presence criteria;
    a subscription feature in the messaging layer whereby collaboration processes of the collaboration system can subscribe to presence information for a particular role of the plurality of roles, wherein the collaboration system monitors changes in role membership and the subscription feature notifies collaboration processes which have subscribed to presence information for the particular roles of the plurality of roles of changes in role membership of the particular role of the plurality of roles;
    wherein the collaboration system is configured to qualify a first participant of the collaboration from the plurality of participants based on the first role, wherein qualifying the first participant includes the collaboration system evaluating the first participant based on the first membership criteria associated with the first role;

wherein the collaboration system is configured to automatically provide a second participant of the collaboration selected from the plurality of participants wherein automatically providing the second participant includes automatically selecting the second participant and inviting the second participant to join the collaboration;

wherein automatically selecting the second participant comprises automatically selecting the second participant based on the second role by dynamically evaluating the plurality of participants based on the second membership criteria and the presence criteria; and wherein inviting the second participant to join the collaboration comprises receiving via the messaging layer a request from the first participant at the collaboration system, forwarding the request via the messaging layer from the collaboration system to the second participant selected by the collaboration system, generating a notification from the collaboration system when the second participant is available to join the collaboration, and communicating between the first participant and the second participant using the messaging layer of the collaboration system.

12. The system of claim 11 wherein, the collaboration system allows the first participant and/or the second participant to interact with one or more business processes.

13. The system of claim 11, wherein the collaboration system propagates and/or obtains presence information for the plurality of participants.

14. The system of claim 11, wherein at least one of the first participant and the second participant is integrated with a process capable of web browsing.

15. The system of claim 11, wherein the second role is based a plurality of criteria in combination with one of arithmetic and logical expressions.

16. The system of claim 11, further including:
a shared state that allows the plurality of participants and the collaboration system to share information.

17. The system of claim 11, wherein the first participant and the second participant communicate using an Application Programming Interface associated with the messaging layer of the collaboration system, wherein the Application Programming Interface exposes messaging functionality of the messaging layer of the collaboration system.

18. The system of claim 11, wherein the first participant and the second participant include a state that is accessible from the collaboration system, and wherein the state indicates whether the first participant and the second participant are available to participate in the collaboration.

19. The system of claim 11, wherein the first participant impersonates the second participant for the purpose of performing an action on behalf of the second participant, and wherein the first participant performs the action with the same one or more privileges of the second participant.

20. A non-transitory computer readable storage medium storing one or more sequences of instructions for a collaboration between a plurality of participants, wherein said instructions, when executed by one or more processors, cause the one or more processors to perform steps comprising:

initiating a collaboration system having a messaging layer, and operating on one or more microprocessor;

defining a plurality of roles including at least a first role subject to a first membership criteria and a second role subject to a second membership criteria and a presence criteria;

providing a subscription feature in the messaging layer whereby collaboration processes of the collaboration system can subscribe to presence information for a particular role of the plurality of roles; and monitoring changes in role membership;

notifying collaboration processes which have subscribed to presence information for the particular roles of the plurality of roles of changes in role membership of the particular role of the plurality of roles;

qualifying a first participant of the collaboration from the plurality of participants based on the first role, wherein qualifying the first participant includes the collaboration system evaluating the first participant based on the first membership criteria associated with the first role;

automatically providing a second participant of the collaboration from the plurality participants using the collaboration system, wherein automatically providing the second participant includes automatically selecting the second participant and inviting the second participant to join the collaboration;

wherein automatically selecting the second participant comprises the collaboration system automatically selecting the second participant based on the second role by dynamically evaluating the plurality of participants based on the second membership criteria and the presence criteria; and wherein inviting the second participant to join the collaboration comprises receiving via the messaging layer a request from the first participant at the collaboration system, forwarding the request via the messaging layer from the collaboration system to the second participant selected by the collaboration system, generating a notification from the collaboration system when the second participant is available to join the collaboration, and communicating between the first participant and the second participant using the messaging layer of the collaboration system.

* * * * *

UNITED STATES PATENT AND TRADEMARK OFFICE
CERTIFICATE OF CORRECTION

| | | |
|---|---|---|
| PATENT NO. | : 9,020,885 B2 | Page 1 of 1 |
| APPLICATION NO. | : 13/481114 | |
| DATED | : April 28, 2015 | |
| INVENTOR(S) | : Beartusk et al. | |

It is certified that error appears in the above-identified patent and that said Letters Patent is hereby corrected as shown below:

Specification

In column 7, line 33, delete "ActionServiet" and insert -- ActionServlet --, therefor.

In column 7, line 39, delete "ActionServiet" and insert -- ActionServlet --, therefor.

In column 11, line 33, delete "running" and insert -- running. --, therefor.

In column 14, line 13, delete "later" and insert -- latter --, therefor.

In column 15, line 60, delete "Message Queue" and insert -- MessageQueue --, therefor.

In column 16, lines 1-2, delete "ScenariosPortalServiet" and insert -- ScenariosPortalServlet --, therefor.

In column 16, line 14, delete "ScenariosPortalServiet" and insert -- ScenariosPortalServlet --, therefor.

In column 16, line 41, delete "get UsersWithRole" and insert -- getUsersWithRole --, therefor.

In column 20, line 20, delete "an the" and insert -- the --, therefor.

In column 23, line 66, delete "discernable" and insert -- discernible --, therefor.

Claims

In column 29, line 41, in Claim 1, after "plurality" insert -- of --.

In column 31, line 33, in Claim 15, after "based" insert -- on --.

In column 32, line 29, in Claim 20, after "plurality" insert -- of --.

Signed and Sealed this
Ninth Day of February, 2016

Michelle K. Lee
*Director of the United States Patent and Trademark Office*